United States Patent
Danielson et al.

(10) Patent No.: US 10,012,988 B2
(45) Date of Patent: Jul. 3, 2018

(54) METHODS AND SYSTEMS FOR PATH PLANNING USING A NETWORK OF SAFE-SETS

(71) Applicant: Mitsubishi Electric Research Laboratories, Inc., Cambridge, MA (US)

(72) Inventors: Claus Danielson, Somerville, MA (US); Avishai Weiss, Cambridge, MA (US); Karl Berntorp, Watertown, MA (US); Stefano Di Cairano, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/363,342

(22) Filed: Nov. 29, 2016

(65) Prior Publication Data

US 2018/0150077 A1     May 31, 2018

(51) Int. Cl.
    *G05D 1/00*     (2006.01)
    *G01C 21/20*     (2006.01)
    *G05D 1/02*     (2006.01)

(52) U.S. Cl.
    CPC ........... *G05D 1/0088* (2013.01); *G01C 21/20* (2013.01); *G05D 1/0214* (2013.01)

(58) Field of Classification Search
    CPC ..... G05D 1/0088; G05D 1/0214; G01C 21/20
    See application file for complete search history.

(56) References Cited

U.S. PATENT DOCUMENTS 5,371,834 A * 12/1994 Tawel ................... B25J 9/1607
                                                                                         706/23
7,447,593 B2 * 11/2008 Estkowski ............. G01C 21/20
                                                                                         700/250

(Continued)

FOREIGN PATENT DOCUMENTS

CN        105786014 A     7/2016

OTHER PUBLICATIONS

Chakravorty et al., "Generalized Sampling-Based Motion Planners," IEEE Transactions on Systems, Man and Cybernetics. Part B: Cybernetics, IEEE. vol. 41, No. 3, Jun. 1, 2011.

*Primary Examiner* — Nicholas Kiswanto
(74) *Attorney, Agent, or Firm* — Gene Vinokur; James McAleenan; Hironori Tsukamoto

(57) ABSTRACT

Systems and methods for controlling a motion of an object from an initial location to a final location within a region while avoiding a set of obstacles located in the region. The systems and methods include selecting, the equilibrium points within the obstacle-free region of the region, and each equilibrium point includes a corresponding controller driving the object to the equilibrium point, such that each controller includes a corresponding state partition. Designing the controller and the corresponding state partition, based on the obstacle-free region around the equilibrium point, to produce a collection of controllers and corresponding equilibrium points and corresponding state partitions, that connect the initial location with the final location. Determining actuator commands at time T using a controller corresponding to a state partition that includes the location of the object at time T, and the resulting sequence over a period of time of actuator commands, moves the object.

20 Claims, 17 Drawing Sheets

(56) References Cited

U.S. PATENT DOCUMENTS

| | | | |
|---|---|---|---|
| 9,488,984 B1* | 11/2016 | Williams | G05D 1/0274 |
| 2014/0278052 A1* | 9/2014 | Slavin | G01C 21/3492 |
| | | | 701/400 |
| 2015/0284010 A1 | 10/2015 | Beardsley et al. | |
| 2016/0004972 A1* | 1/2016 | Alboszta | G06N 99/002 |
| | | | 706/52 |
| 2017/0080567 A1* | 3/2017 | Quinquis | B25J 9/1682 |
| 2017/0240180 A1* | 8/2017 | Hirai | B60W 40/06 |

* cited by examiner

METHODS AND SYSTEMS FOR PATH PLANNING USING A NETWORK OF SAFE-SETS

FIELD

The present disclosure relates generally to path planning of an object within an environment, in particular, generating physically realizable trajectories that guide the object from an initial location to a final location while avoiding collisions with obstacles in the environment.

BACKGROUND

Most methods for handling an obstacle avoidance problem include a grid and/or graph based search, and relative velocity and distance based conditions or constraints.

In the grid and/or graph based search methods, grid cells or graph nodes are assigned obstacle dependent cost, thus allowing the algorithm to find collision free trajectories. However, the algorithms can require significant computer memory and the efficiency of the algorithms is heavily dependent on the heuristics used.

Further, these existing methods for generating physically realizable trajectories for an object that avoid collision with obstacles uses a network of safe-sets. The safe-sets are collections of trajectories for the object in closed-loop with a pre-designed controller that drives the object to a safe equilibrium point. The equilibrium points are selected by gridding the obstacle-free space. A safe and physically realizable trajectory can be found by searching the network for a sequence of equilibrium states that takes the object from the initial state to the target state. Wherein these pre-designed controllers can then be used to drive the state of the object to the corresponding equilibrium points in sequence while avoiding obstacles.

However, these pre-designed controllers that drive the object to the corresponding equilibrium state are pre-designed without information about the placement of obstacles relative to the equilibrium point. There are several disadvantages using the pre-designed controllers, for example, the maximum volume of the safe-sets is limited since the controllers are pre-designed, therefore the safe-set shapes are fixed. This can be a problem when the object must past through a narrow passage or close to an obstacle.

The equilibrium point around which the safe-sets are constructed are selected by gridding or graphing the obstacle-free space, is also a problem. For example, the aspect of gridding or graphing places the equilibrium points regularly, while the obstacles may not be uniformly distributed. Because of using the methods of gridding or graphing, results in the safe-sets near obstacles that must be small to avoid collisions. Thus, the gridding or graphing must be very fine producing an excessive number of points. However far from the obstacles, the larger safe-sets will cover many of their neighbors making them those sample points unnecessary. Finally, by only choosing equilibrium points that lie on a grid or graph, the prior art will miss nearby points that may be advantageous to have in the network.

SUMMARY

Some embodiments of present disclosure are based on generating physically realizable trajectories that guide an object from an initial location to a final location while avoiding collisions with obstacles in an environment.

The present disclosure is based on the realization controllers that drive the object to a corresponding equilibrium state that needs to be designed with information about the placement of obstacles relative to the equilibrium point.

Another realization of the present disclosure is that when constructing safe-sets, local information about the environment, i.e. the obstacle locations need to be considered, to design a controller, along with using a positive invariant set that is best suited to the local environment. For instance, the controller can be designed so that its positive invariant set is shaped to the local environment to maximize volume while avoiding obstacles. Safe-sets are collections of trajectories for the object in a closed-loop with a designed controller that drives the object to a safe equilibrium point.

Based on these realizations, we discovered when constructing safe-sets, a maximum volume of the safe-sets is not limited since the controllers are designed using information about the placement of obstacles. These safe-sets are called constrain-admissible positive invariant sets. Having safe-sets with larger volume means fewer equilibrium points needed to be sampled in order to find a path from the initial state to the final state. In addition, larger volume safe-sets lead to more links in the network and therefore more potential paths that the object can follow from the initial state to the final state. Thus, the object can choose the best among many paths for better performance.

We further discovered when constructing safe-sets based on these realizations, that a minimum volume of the safe-sets is not limited, since the controllers are designed with information about the placement of obstacles relative to the equilibrium point. We learned through experimentation that when the object passes through a narrow passage or close to an obstacle, that by designing the controller using information about the placement of obstacles, the controller can focus on redirecting disturbances that can cause a collision and ignore disturbances that push the object away from the obstacles.

Another realization of the present disclosure is based on splitting the design of controllers and positive invariant sets into two phases. The first phase, designs parametric controllers and parametric positive invariant sets that satisfy the object dynamics and input constraints. The second phase selects the parameters for the parametric controllers and positive invariant sets to maximize volume while avoiding obstacles. At least one advantage of this embodiment is that the computationally expensive first step can be computed offline, and the computationally inexpensive parameter selection can be done in real-time.

Another realization of the present disclosure is based selecting the placement of the safe-sets. For example, the equilibrium points can be placed by randomly sampling of a portion of the obstacle-free region not covered by safe-sets. At least advantage is that the network can contain many disconnected sub-networks, such that this reduces the number of safe-sets needed to cover the obstacle-free region. At least one aspect of placing equilibrium points by randomly sampling of the obstacle-free space, and moving the sample point, is to be able to connect the sample point to the network. For example, the present disclosure provides for the sampled equilibrium points to be moved to a nearby position or a more advantageous position. Such that, by allowing sample equilibrium points to be moved, the present disclosure ensures that every node in the network has a path to the final state. In addition, moving equilibrium points can be used to increase the connectivity of the network to provide more potential paths, or to move equilibrium points into positions that would create a smoother path.

Another aspect of using random sampling methods is that random sampling methods require significantly fewer points to find a path from the initial state to the final state. The random sampling naturally produces smoother paths for the object to follow, whereas the prior art creates a network on a grid and forces the object to follow a rectilinear path from the initial state to the final state. In addition, random sampling of the present disclosure allows the use of heuristics for selecting the equilibrium points to produce more ideal paths.

To better understand how the systems and methods of the present disclosure may be implemented, we can provide a brief overview of some of the steps. For example, an initial step may include accessing stored region data from memory using a processor within a computer or just from a processor itself. The stored region data can include aspects of the region containing obstacles located in within region, such as an obstacle-free region, equilibrium points within the obstacle-free region and an initial location and a final location for an object to start and end within the region. It is noted that the sequence of steps does not have to be in the order provided in the present example and could be ordered differently, as well as fewer or additional steps may be incorporated depending upon the specific application to be executed.

The next step may include selecting the equilibrium points within the obstacle-free region of the region from the memory. Wherein each equilibrium point includes a corresponding controller that drives the object to the equilibrium point, such that each controller includes a corresponding state partition. Remember, at least one realization included that the controller can be designed so that its positive invariant set is shaped to the local region to maximize volume while avoiding obstacles. And, safe-sets are collections of trajectories for the object in a closed-loop with a designed controller that drives the object to a safe equilibrium point. Further by having safe-sets with larger volume means fewer equilibrium points needed to be sampled in order to find a path from the initial state to the final state. Also, the larger volume safe-sets lead to more links in the network and therefore more potential paths that the object can follow from the initial state to the final state. Thus, the object can choose the best among many paths for better performance.

The next step may include designing the controller and the corresponding state partition, based on the obstacle-free region around the equilibrium point, to produce a collection of controllers and corresponding equilibrium points and corresponding state partitions, that connect the initial location with the final location. Such that a state partition includes the initial location and a state partition includes the final location. Wherein, each state partition is a sub-region of the region that is obstacle free within the region, and if the object is in the corresponding state partition of the controller, then the controller directs all the trajectories of the object to remain within the corresponding state partition and to move to the equilibrium point of the corresponding controller. It is noted that this first phase could be completed off-line since it can be computationally expensive, i.e. the first phase includes designing the parametric controllers and parametric positive invariant sets that satisfy the object dynamics and input constraints. The second phase may include selecting the parameters for the parametric controllers and positive invariant sets to maximize volume while avoiding obstacles, which is mostly likely to be done in real-time because it is computationally inexpensive to do.

Finally, the last step can include determining actuator commands at time T using a controller corresponding to a state partition that includes the location of the object at time T. Wherein, the resulting sequence over a period of time of actuator commands, moves the object from the initial location to the final location over the period of time. Such that, the determined actuator commands move the object to prevent the object from colliding with the set of obstacles located in the region. If you remember, we realized that the equilibrium points can be placed by randomly sampling of a portion of the obstacle-free region not covered by safe-sets. This meant, that the network can contain many disconnected sub-networks, which can reduce the number of safe-sets needed to cover the obstacle-free region. An aspect of moving the sample point is to connect the sample point to the network and/or provide for the sampled equilibrium points to be moved to a more advantageous (or nearby) position. Some advantages to doing this (among many advantages), is ensuring that every node in the network has a path to the final state, increase the connectivity of the network to provide more potential paths or to move equilibrium points into positions that would create a smoother path.

According to an embodiment of the present disclosure, a method for controlling a motion of an object from an initial location to a final location within a region while avoiding a set of obstacles located in the region. Wherein a processor is in communication with a memory, and the memory includes stored region data. The stored region data includes obstacles located in the region, an obstacle-free region of the region, equilibrium points within the obstacle-free region of the region and the initial location and the final location within the region. The method including selecting, by a processor, the equilibrium points within the obstacle-free region of the region from the memory. Wherein each equilibrium point includes a corresponding controller that drives the object to the equilibrium point, such that each controller includes a corresponding state partition. Designing the controller and the corresponding state partition, based on the obstacle-free region around the equilibrium point, to produce a collection of controllers and corresponding equilibrium points and corresponding state partitions, that connect the initial location with the final location. Wherein at least one state partition includes the initial location and at least one state partition includes the final location. Further, each state partition is a sub-region of the region that is obstacle free within the region, and if the object is in the corresponding state partition of the controller, then the controller directs all the trajectories of the object to remain within the corresponding state partition and to move to the equilibrium point of the corresponding controller. Finally, determining actuator commands at time T using a controller corresponding to a state partition that includes the location of the object at time T. Wherein, the resulting sequence over a period of time of actuator commands, moves the object from the initial location to the final location over the period of time. Further, the determined actuator commands move the object to prevent the object from colliding with the set of obstacles located in the region and assists in management of guiding the object.

According to another embodiment of the present disclosure, a non-transitory computer readable storage medium embodied thereon a program executable by a computer for performing a method. The method for controlling a motion of an object from an initial location to a final location within a region, while avoiding a set of obstacles located in the region. Wherein the non-transitory computer readable storage medium includes stored region data. The stored region data includes obstacles located in the region, an obstacle-free region of the region, equilibrium points within the obstacle-free region of the region and an initial location and the final location within the region The method including selecting, by the processor, equilibrium points within the obstacle-free region of the region. Wherein each equilibrium point includes a corresponding controller that drives the object to the equilibrium point, such that each controller includes a corresponding state partition and an actuator. Designing, by the processor, the controller and the corresponding state partition, based on the obstacle-free region around the equilibrium point, to produce a collection of controllers and corresponding equilibrium points and corresponding state partitions, connecting the initial location with the final location. Wherein at least one state partition includes the initial location and at least one state partition includes the final location. Further, each state partition is a sub-region of the region that is obstacle free within the region, and if the object is in the corresponding state partition of the controller, then the controller directs all the trajectories of the object to remain within the corresponding state partition and to move to the equilibrium point of the corresponding controller. Finally, determining, by the processor, actuator commands at time T using a controller corresponding to a state partition that includes the location of the object at time T. Wherein, the resulting sequence over a period of time of actuator commands, moves the object from the initial location to the final location over the period of time, and the method assists in management of guiding the object.

According to another embodiment of the present disclosure, a system for controlling a motion of an object from an initial location to a final location within a region, while avoiding a set of obstacles located in the region. The system including at least one actuator is in communication with a controller. A computer readable memory to store and provide region data. The stored region data includes obstacles located in the region, an obstacle-free region of the region, equilibrium points within the obstacle-free region of the region and an initial location and the final location within the region. A processor in communication with the computer readable memory, is configured to select equilibrium points within an obstacle-free region of a region. Wherein each equilibrium point includes a corresponding controller that drives the object to the equilibrium point, such that each controller includes a corresponding state partition. The processor is further configure to design the controller and the corresponding state partition, based on the obstacle-free region around the equilibrium point, to produce a collection of controllers, corresponding equilibrium points and corresponding state partitions, connecting the initial location with the final location. Wherein, at least one state partition includes the initial location and at least one state partition includes the final location. Further still, each state partition is a sub-region of the region that is obstacle free within the region, and if the object is in the corresponding state partition of the controller, then the controller directs all the trajectories of the object to remain within the corresponding state partition and to move to the equilibrium point of the corresponding controller. Finally, the processor is configured to determine actuator commands at time T using a controller corresponding to a state partition that includes the location of the object at time T. Wherein, the resulting sequence over a period of time of actuator commands, moves the object from the initial location to the final location over the period of time, and displaying the movement of the object via the determined actuator commands on a user interface.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figure 1A:
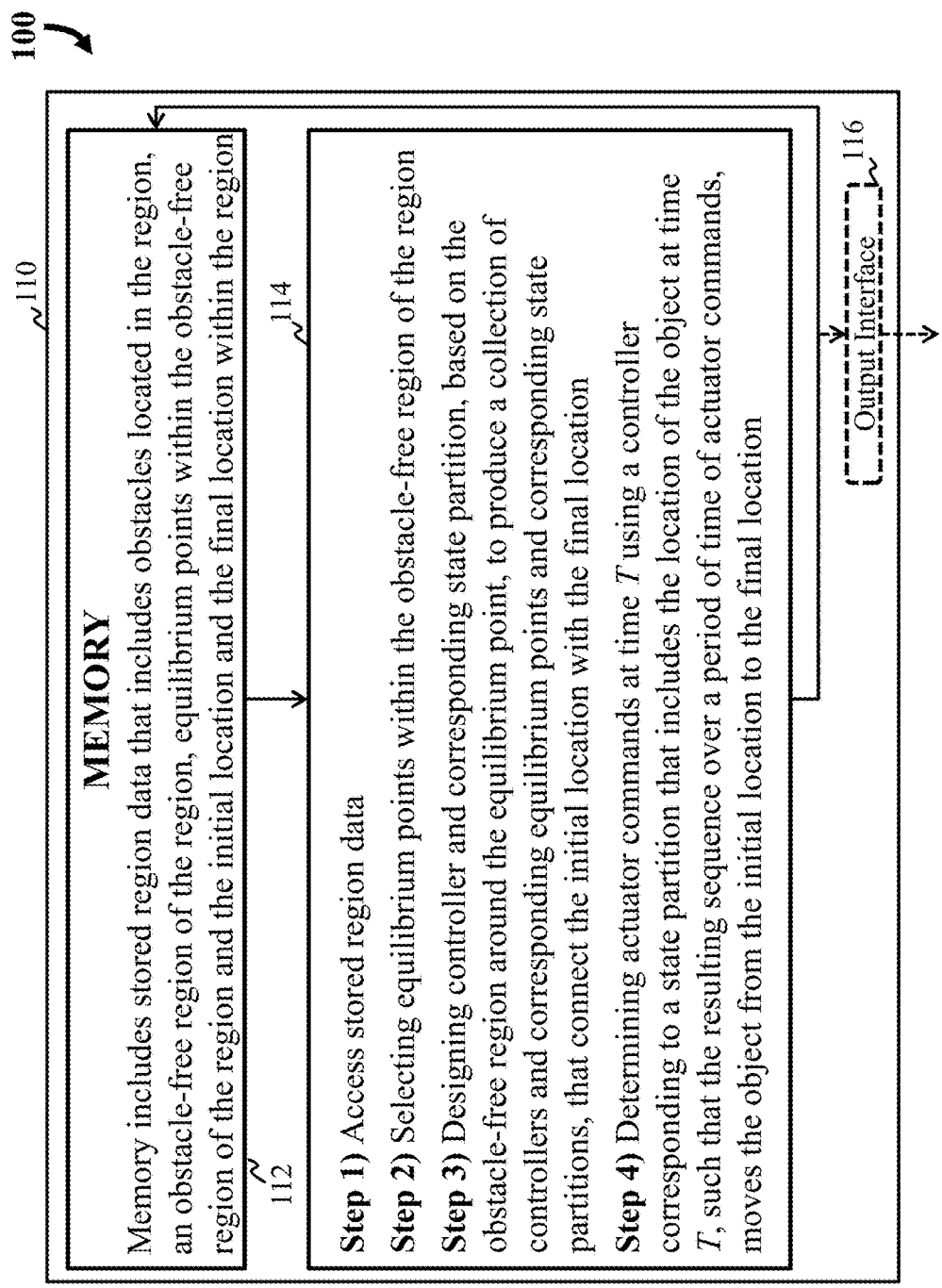
FIG. 1A is a block diagram illustrating the method for controlling a motion of an object from an initial location to a final location within a region while avoiding a set of obstacles located in the region, according to an embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview of Embodiments of the Present Disclosure

Figure 1B:
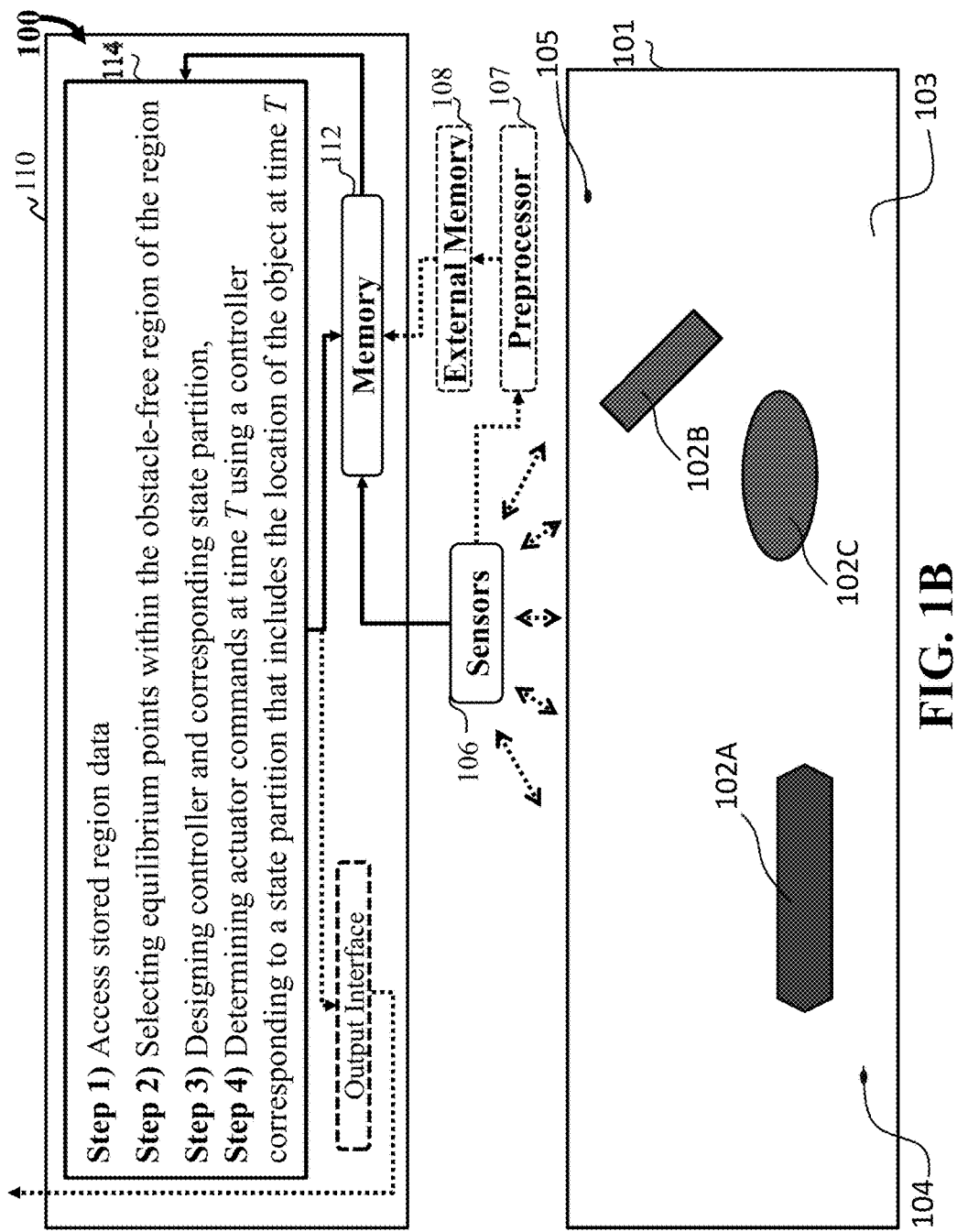
FIG. 1B is a block diagram illustrating components of the method of FIG. 1A, according to an embodiment of the present disclosure.

FIG. 1A and FIG. 1B are block diagrams illustrating method 100 for controlling a motion of an object from an initial location to a final location within a region while avoiding a set of obstacles located in the region, according to an embodiment of the present disclosure.

FIG. 1A shows a computer 110 having a memory 112 in communication with a processor 114, wherein an output interface may be in communication with processor 114. The processor 114 is configured to implement step 1 to step 4 of method 100. FIG. 1B further illustrates the method steps of FIG. 1A and components of the method 100 of FIG. 1A. For example, FIG. 1B shows sensors 106 in communication with memory 112 or optionally in communication with an input interface/preprocessor 107 for processing the region data and stored in an external memory 108. Wherein the region data may be sent from the external memory 108 to the memory 112, to be later accessed by the processor 114. It is contemplated the region data could be directly communicated to processor 114 by passing memory 112 and external memory 108. Region 101 of FIG. 1B includes obstacles 102A, 102B and 102C in region 101. It is noted that the number of obstacles in region 101 is not limited to three, but could be more than three obstacles. An object's (not shown) initial state/position/location 104 is the start position, and the final state/position/location 105 is the object's final and end travel position within region 101.

Referring to FIG. 1A and FIG. 1B, step 1 includes accessing stored region data from memory 112 within the computer 110 by the processor 114. The stored region data can include stored region data that includes obstacles 102A, 102B, 102C located in region 101, an obstacle-free region 103 of the region 101, equilibrium points (111, 113, 115, 117, 119, 121 of FIG. 1C) within the obstacle-free region 103 of the region 101 and the initial location 104 and the final location 105 within the region 101. The memory 112 may also include historical data related to moving objects (not shown) with a region and other data that may assist in guiding the object from the initial position to the final position.

Step 2 includes selecting the equilibrium points (111, 113, 115, 117, 119, 121 of FIG. 1C) within the obstacle-free region 103 of the region 101 from the memory 112. Wherein each equilibrium point (111, 113, 115, 117, 119, 121 of FIG. 1C) includes a corresponding controller (not shown) that drives the object (not shown) to the equilibrium point, such that each controller includes a corresponding state partition. As noted above, based on our realization we designed the controller so that its positive invariant set is shaped to the local region 101 to maximize volume while avoiding obstacles 102A, 102B, 102C. Wherein, safe-sets are collections of trajectories for the object in a closed-loop with a designed controller that drives the object to a safe equilibrium point. Further, one aspect of having safe-sets with larger volume in which we learned through experimentation meant fewer equilibrium points needed to be sampled in order to find a path from the initial state to the final state. Also, we learned that the larger volume safe-sets lead to more links in the network and therefore more potential paths that the object can follow from the initial state to the final state. Thus, the object can choose the best among many paths for better performance.

Step 3 is based on our realization where we split the design of the controllers and positive invariant sets into two phases. The first phase includes designing parametric controllers and parametric positive invariant sets that satisfy the object dynamics and input constraints. Another words, we designed the controller and the corresponding state partition, based on the obstacle-free region 103 around the equilibrium point (111, 113, 115, 117, 119, 121 of FIG. 1C), to produce a collection of controllers and corresponding equilibrium points and corresponding state partitions, that connect the initial location 104 with the final location 105. Such that a state partition includes the initial location 104 and a state partition includes the final location 105. Wherein, each state partition is a sub-region of the region 101 that is obstacle free within the region 101, and if the object is in the corresponding state partition of the controller, then the controller directs all the trajectories of the object to remain within the corresponding state partition and to move to the equilibrium point of the corresponding controller. The second phase includes selecting the parameters for the parametric controllers and positive invariant sets to maximize volume while avoiding obstacles, which is implemented in the next step.

Finally, step 4 includes determining actuator commands at time T using a controller corresponding to a state partition that includes the location of the object at time T. Wherein, the resulting sequence over a period of time of actuator commands, moves the object from the initial location to the final location over the period of time. Such that, the determined actuator commands move the object to prevent the object from colliding with the set of obstacles located in the region. As noted above, we realized that the equilibrium points (111, 113, 115, 117, 119, 121 of FIG. 1C) can be placed by randomly sampling of a portion of the obstacle-free region 103 not covered by safe-sets. This meant, that the network can contain many disconnected sub-networks, which can reduce the number of safe-sets needed to cover the obstacle-free region. An aspect of moving the sample point is to connect the sample point to the network and/or provide for the sampled equilibrium points to be moved to a more advantageous (or nearby) position. Some advantages to doing this (among many advantages), is ensuring that every node in the network has a path to the final state 105, increase the connectivity of the network to provide more potential paths (i.e. an effect of the second phase) or to move equilibrium points into positions that would create a smoother path.

Figure 1C:
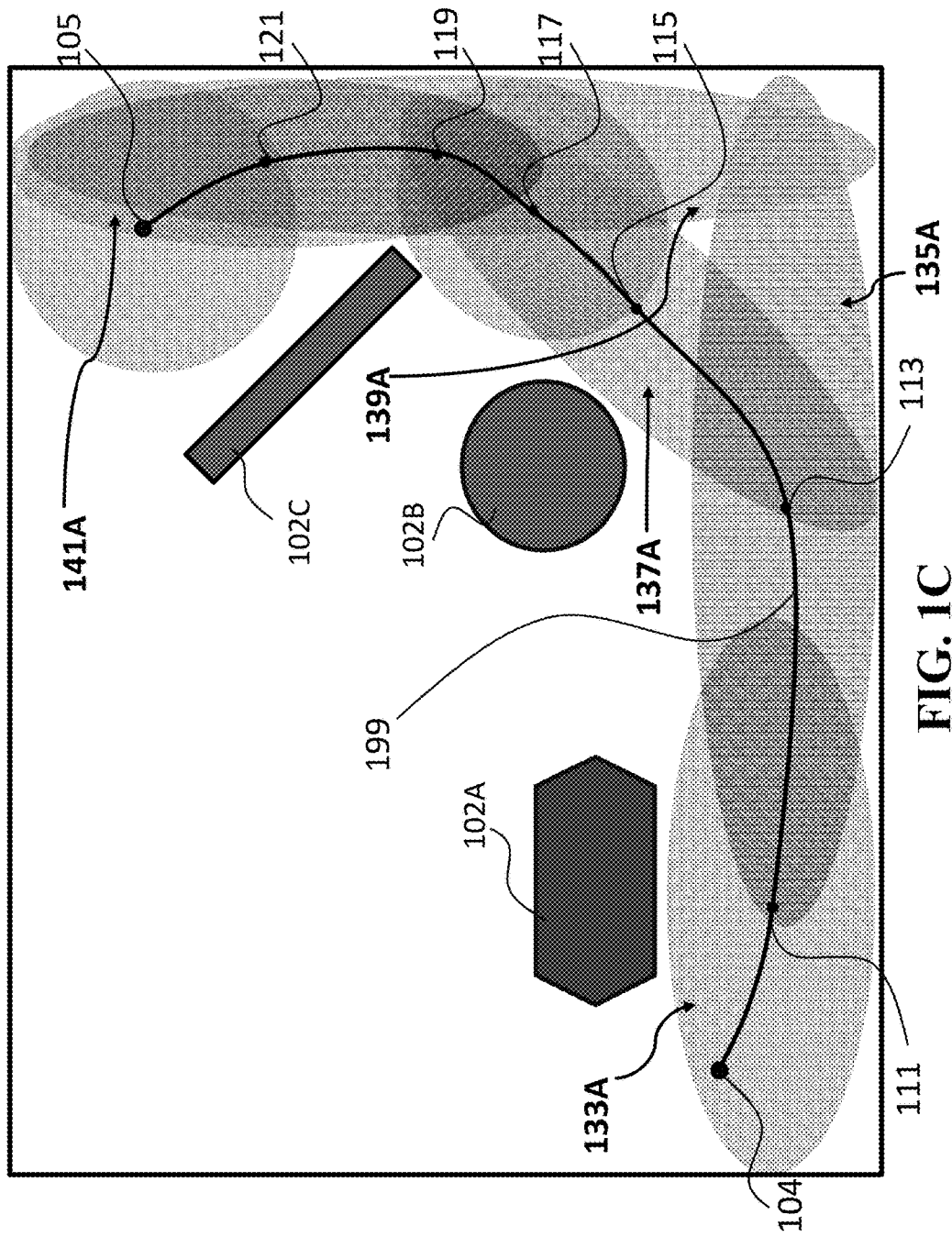
FIG. 1C is a block illustrating the method of FIG. 1A and FIG. 1B, as how the present disclosure uses the network of equilibrium states and positive invariant sets to drive the object state from an initial state to a final state while satisfying input constraints and avoiding obstacles, according to an embodiment of the present disclosure.

FIG. 1C is a block illustrating the method of FIG. 1A and FIG. 1B, as how the present disclosure uses the network of equilibrium states and positive invariant sets to drive the object state from an initial state to a final state while satisfying input constraints and avoiding obstacles, according to an embodiment of the present disclosure. In particular, FIG. 1C shows the obstacle-free space 103 from FIG. 1B with sampled equilibrium points 111, 113, 115, 117, 119, 121 and surrounding constraint-admissible robust positive invariant sets 133A, 135A, 137A, 139A, 141A. The equilibrium points in FIG. 1C are connected in a network to provide a path 199 through this network from the initial state 104 to the final equilibrium state 105. This path 199 is the sequence of equilibrium points 111, 113, 115, 117, 119, 121 which ends at the final equilibrium state 105.

Path Planning Problem

At least one aspect of the present disclosure is to drive the position y(t) of an object from some initial state $x_0$ to some goal position $y_f$ while satisfying constraints on the input and avoiding collisions with obstacles. The dynamics of the object are modeled by the following discrete-time system $$x(t+1)=f(x(t),u(t),d(t)) \quad (1)$$

$$y(t)=g(x(t)) \quad (2)$$

where $x(t) \in R^{n_x}$ is the state, $u(t) \in F^{n_u}$ is the control input, and $y(t) \in R^{n_y}$ is the output. The disturbance d(t) is unknown, but bounds D on the disturbance are known $d(t) \in D$. The input u(t) and output y(t) are subject to constraints $u(t) \in U$ and $y(t) \in Y$. In particular, the output set $Y \subseteq R^{n_y}$ is the different of some convex bounding set $\overline{Y}$ minus a collection of obstacles set $\{B_i\}_{i=1}^{N} \subseteq R^{n_y}$ $$Y = \overline{Y} \backslash (\cup_{i=1}^{N} B_i). \quad (3)$$

FIG. 1B shows an example of the obstacle-free space Y. The convex bounding set $\overline{Y}$ is labeled 101. The three obstacles $B_1$, $B_2$, and $B_3$ are labeled 102A, 102B, 102C. The obstacle-free space Y is the white-space labeled 103. The initial position $y_0 = g(x_0) \in Y$ corresponding to the initial state $x_0$ of the object is labeled 104. The final desired position of the object $\overline{y}_f$ is labeled 105. In this example, at least one objective of the present disclosure is to move the object from the initial position 104 to the final position 105 through the obstacle-free space 103 while avoiding the obstacles 102A, 102B, 102C.

The problem of finding a path through obstacle-free space Y is difficult for two reason: the set Y is generally non-convex and the dynamics (Section 1.1) of the object are complex. Some prior art methods ignore the object dynamics (Section 1.1) to make this problem simpler. However, those methods can produce paths that are impossible for the object to follow. On the other hand, the present disclosure explicitly considers the dynamics (Section 1.1) of the object and uses feedback control to ensure that the produced paths are physically realizable by the object.

1.2 Equilibria, Controllers, and Invariant Sets

The present disclosure assumes that the object can hold position at any point in the obstacle-free region Y when the disturbance is zero d(t)=0. This means the for each position $\overline{y} \in int(Y)$ there exists an equilibrium state $\overline{x}$ and equilibrium input $\overline{u} \in int(U)$ such that $$\overline{x}=f(\overline{x},\overline{u},0) \quad (4)$$

$$\overline{y}=g(\overline{x}). \quad (5)$$

The present disclosure samples points $\overline{y}_i \in int(Y)$ from the obstacle-free region Y and designs a controller $\kappa_i$ that drives the object state x(t) to the equilibrium state $\overline{x}_i$. Details about how the points $\overline{y}_i \in Y$ are sampled from the obstacle-free space Y are described in Section 1.5. The controller that drives the object state x(t) to the equilibrium point $\overline{x}_i$ has the form $$u(t)=\kappa_i(x(t)-\overline{x}_i). \quad (6)$$

Associated with each equilibrium point (Section 1.2) and corresponding controller (Eq. 6) we have a positive invariant set O. A set O is positive invariant if any state trajectory x(t) of the object in closed-loop with the controller (Eq. 6) that starts inside the set $x(0) \in O$ remains inside the set $x(t) \in O$ for all future times t ∈ N for zero-disturbance d(t)=0.

Figure 2:
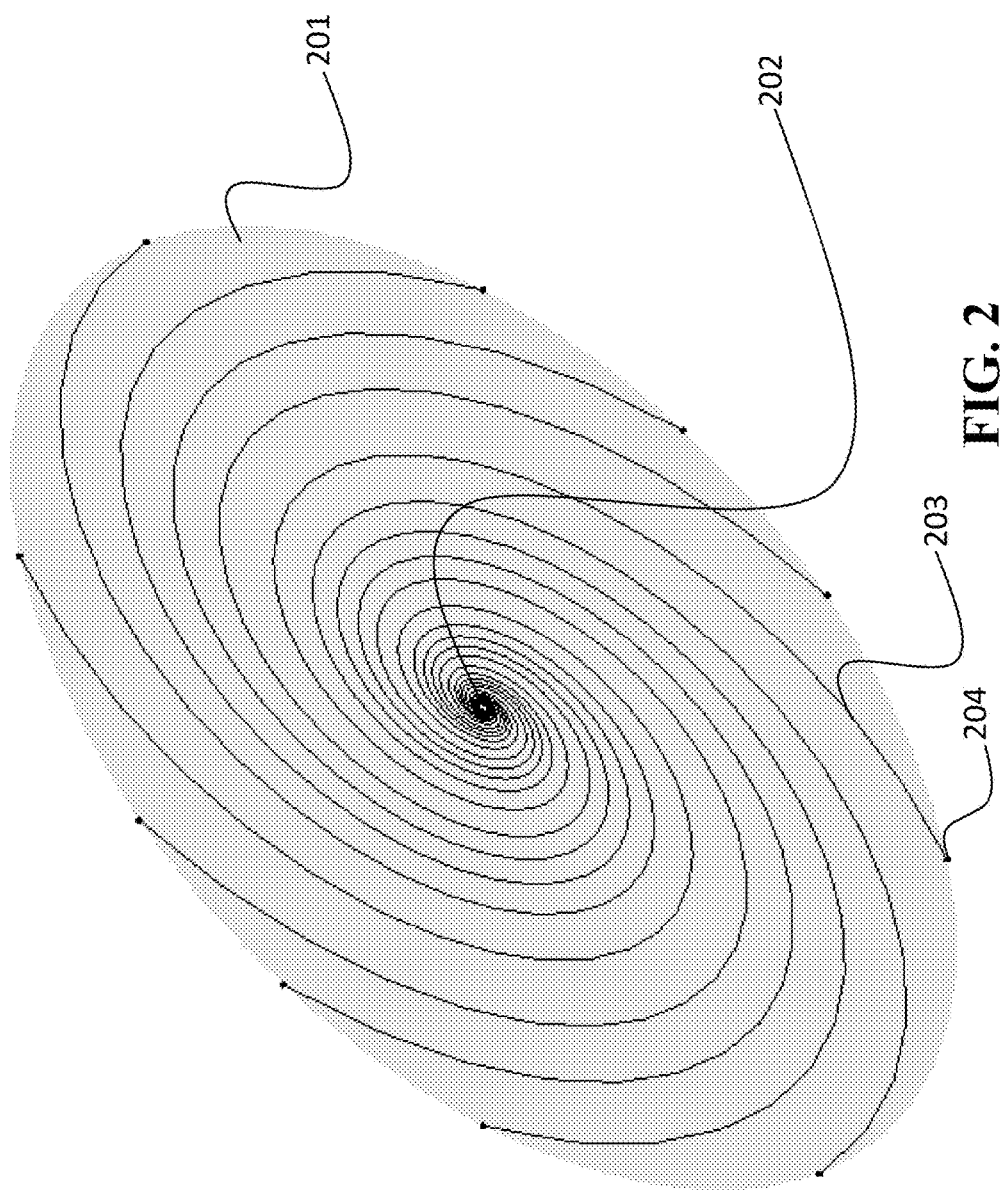
FIG. 2 is a schematic illustrating an example of a positive invariant set, according to an embodiment of the present disclosure.

FIG. 2 shows an example of a positive invariant set. The positive invariant set $O_i$ is the gray region labeled 201. The corresponding controller drives the object state x(t) to the corresponding equilibrium point $\overline{x}_i$, labeled 202, at the center of the positive invariant set $O_i$. The closed-loop trajectories of the object governed by the controller $\kappa_i$ are labeled 203. The object starts at the point labeled 204 and follows the trajectory 203 to the equilibrium point 202. The entire trajectory 203 remains inside the positive invariant set 201.

For the sample points $\bar{y}_i \in \text{int}(Y)$ in the interior of the obstacle-free region Y, it is possible to find a positive invariant set $O_i$ small enough so that it does not intersect with constraints. A positive invariant set $O_i$ that does not intersect any of the obstacles $g(O_i) \subseteq Y$ in the environment Y and satisfies the input constraints $\kappa(O_i - \bar{x}_i) \subseteq U$ is called constraint-admissible. The constraint-admissible positive invariant set $O_i$ is used to determine when it is safe to use the controller (Eq. 6) to drive the state $x(t)$ of the object to the equilibrium state $\bar{x}_i$. The present disclosure only engages the controller (Eq. 6) once the object state is inside a constraint-admissible positive invariant set $x(0) \in O_i$, therefore the state trajectory $y(t)$ of the object (Section 1.1) in closed-loop with the controller (Eq. 6) is guaranteed not to collide with an obstacles since $x(t) \in O_i$ and $g(O_i) \subseteq Y$.

Figure 3:
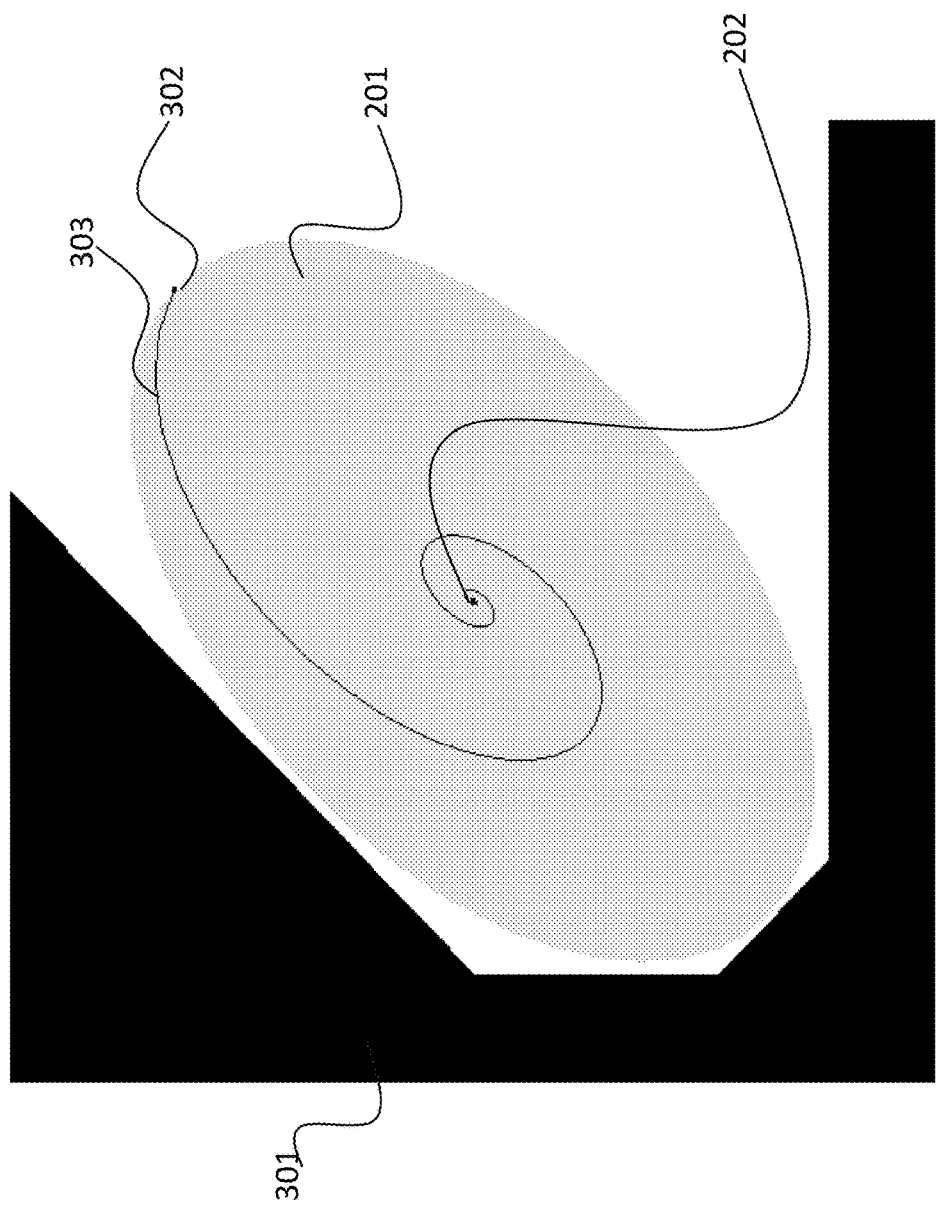
FIG. 3 is a schematic illustrating how a constraint-admissible positive invariant set can be used to guarantee that the object does not collide with obstacles, according to embodiments of the present disclosure.

FIG. 3 shows how a constraint-admissible positive invariant set can guarantee that the object does not collide with obstacles. FIG. 3 shows the positive invariant set labeled 201 from the previous figure, near an obstacle labeled 301. The positive invariant set 201 is constraint-admissible since it does not intersect the obstacle 301. Therefore, any state trajectory $x(t)$ that starts inside the set $x(o) \in O$ will not collide with an obstacle since the trajectory remains inside the set 201. An example of such a state trajectory $x(t)$ is labeled 303. This state trajectory starts at the state labeled 302 and moves to the equilibrium point labeled 202 at the center of the positive invariant set 201. Along the way, the state trajectory 303 does not leave the positive invariant set 201. Thus, even through the object takes a complicated path 303 from the initial state 302 to the equilibrium state 202 it does not collide with an obstacle.

In prior art, the controller and its positive invariant set were pre-designed using only information about the dynamics (Section 1.1) of the object, but without information about the placement of obstacles in the environment. The positive invariant set was then scaled to ensure that it does not intersect with obstacles. The prior art approach is not necessarily valid when the object dynamics (Section 1.1) are non-linear.

One of the novel aspects of the present disclosure, is that the controller (Eq. 6) and corresponding positive invariant set $O_i$ are designed using information about both the object dynamics (Section 1.1) and the placement of obstacles relative to the sampled point $\bar{y} \in Y$. Thus, this approach is applicable to systems with non-linear dynamics.

Figure 4:
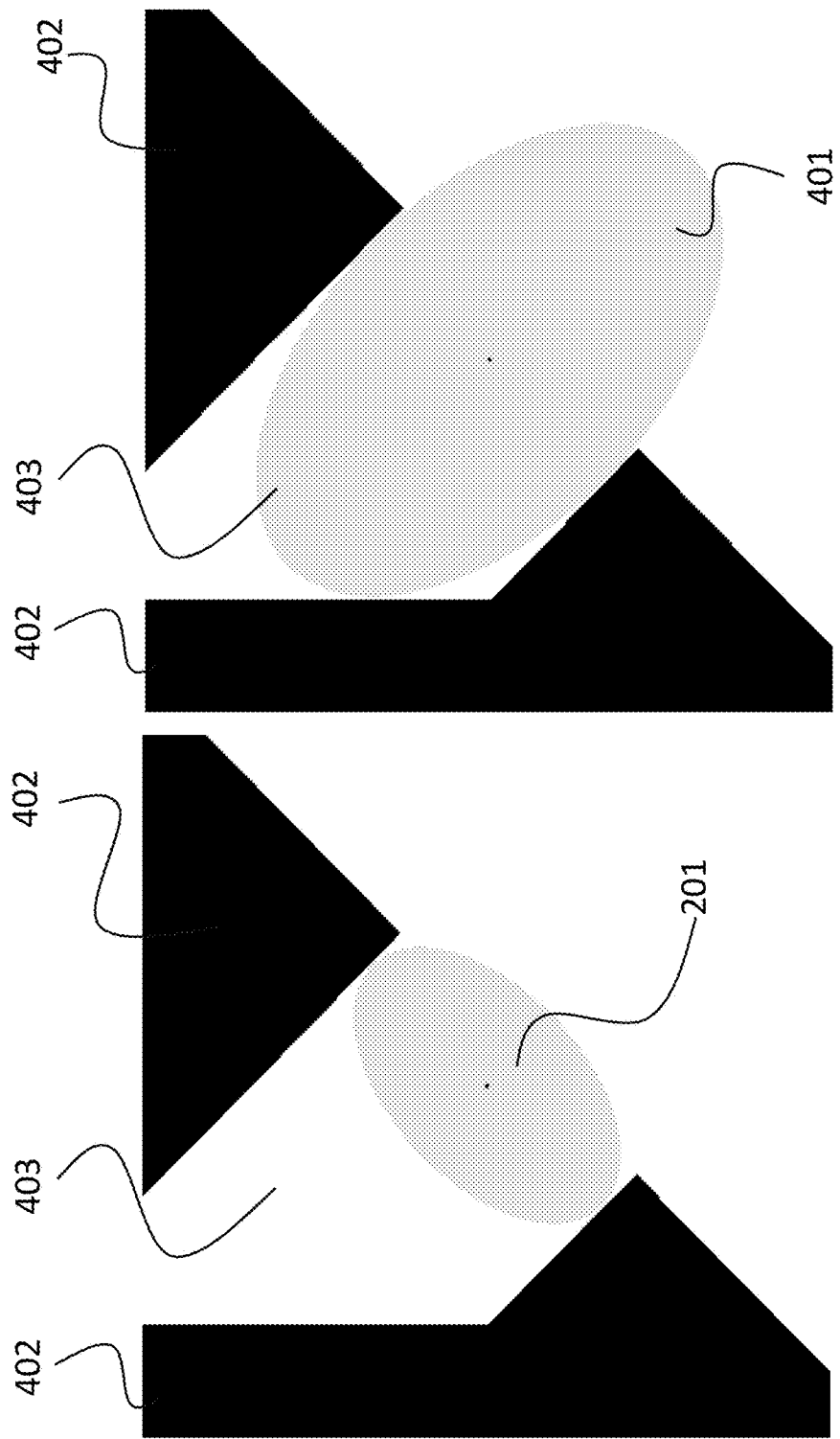
FIG. 4 is a schematic illustrating how a constraint-admissible positive invariant set can be shape for the local obstacle placement in order to increase volume, according to embodiments of the present disclosure.

Referring to FIG. 4, another advantage of the present disclosure is that the positive invariant set will be larger since they are shaped for local obstacle placement. FIG. 4 shows how shaping the positive invariant sets $O_i$ for the relative placement of obstacles can increase the volume of the positive invariant sets $O_i$. On the left is the pre-designed positive invariant set 201 from FIG. 2. In order to fit this positive invariant set 201 inside the obstacle labeled 402, the positive invariant set needed to be scaled down. On the right is a positive invariant set 401 specifically designed for the collection of obstacle 402. Since the positive invariant set 401 was specifically design for the obstacles 402, it is much larger than the pre-designed positive invariant set 201. The larger positive invariant set 401 allows the present disclosure to exploit more of the obstacle-free region, labeled 403, when planning paths. Other advantages of having large positive invariant sets will be described in Section 1.4.

A non-zero disturbance $d(t) \neq 0$ will push the state $x(t)$ of the object (Section 1.1) away from the equilibrium state $\bar{x}_i$. In this case, the state $x(t)$ of the object will not remain at the equilibrium point $\bar{x}_i$, but it will remain in a neighborhood of the equilibrium $O_i$ called a robust positive invariant set. A set $O_i$ is robust positive invariant if any state trajectory $x(t)$ of the object in closed-loop with the controller (Eq. 8) that starts inside the set $x(0) \in O_i$ remain inside the set $x(t) \in O_i$ for all future times and for all disturbances $d(t) \in D$. The smallest robust positive invariant set is called the minimal robust positive invariant set $O_i^{min}$. This set $O_i^{min}$ represents the smallest neighborhood of the equilibrium state $\bar{x}_i$ that the controller (Eq. 6) can keep the state $x(t)$ inside despite persistent disturbances $d(t) \in D$. A stronger set of disturbances D will produce a larger minimal robust positive invariant set. While a stronger the controller (Eq. 6) or weaker disturbance will produce a smaller minimal robust positive invariant set. If the disturbance is zero $D = \{0\}$ then the minimal robust positive invariant set $O_i^{min} = \{\bar{x}_i\}$ contains only the equilibrium point $\bar{x}_i$.

Figure 5:
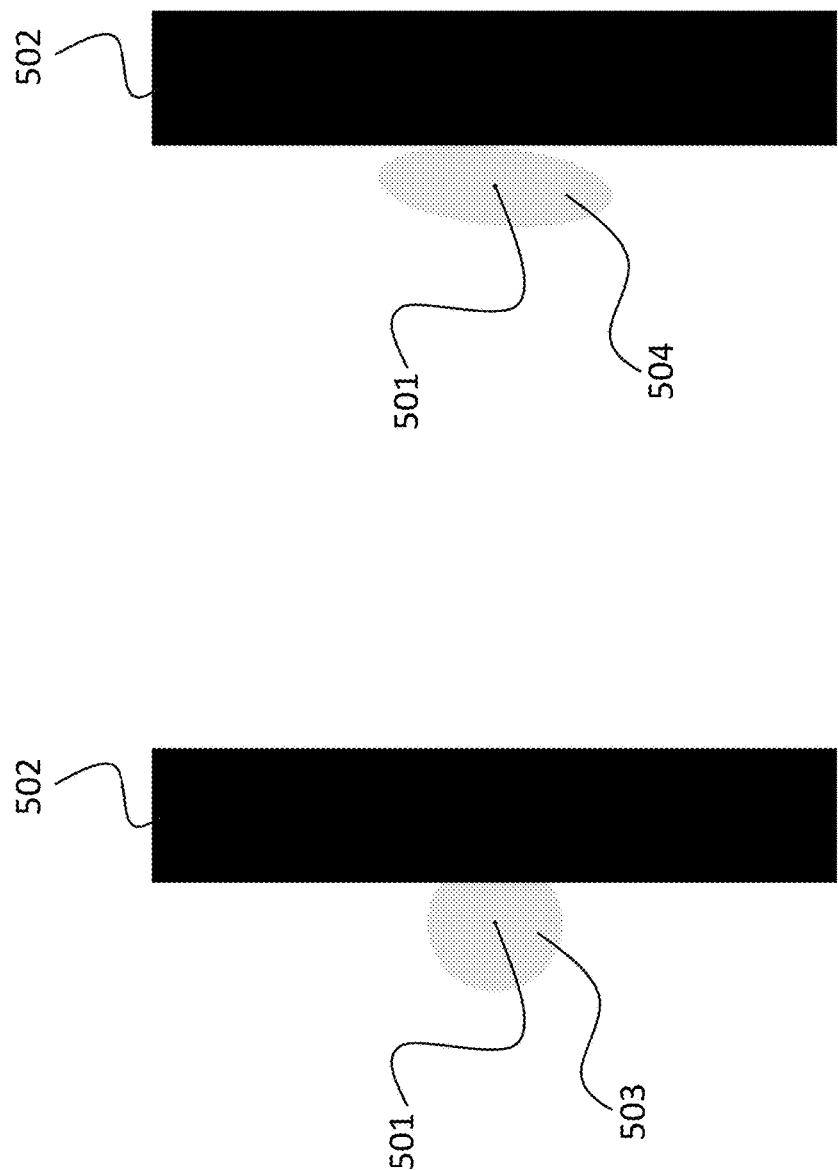
FIG. 5 is a schematic illustrating how the minimal robust positive invariant set can be shape in order to fit in a small space, according to embodiments of the present disclosure.

Referring to FIG. 5, another nother advantage of the present disclosure is that by using information about the object dynamics (Section 1.1), obstacle placement, and bounds on the disturbance D, the minimal robust positive invariant set can be shaped for the local environment as demonstrated by FIG. 5. FIG. 5 shows an example where a sample point $\bar{y} \in Y$, labeled 501, was selected near an obstacle labeled 502. The gray region, labeled 503, is the minimal robust positive invariant set O for a pre-designed controller that did not account for the position of the obstacle 502. As a result, the minimal robust positive invariant set 503 for this controller intersects the obstacle 502 i.e. 503 is not constraint-admissible. This means that it is possible for a disturbance to push the object state $x(t)$ away from the equilibrium point 501 into the obstacle 502. On the other hand, the present disclosure designs a controller using information about the placement of the obstacle 502 relative to the sample point 501. The corresponding minimal robust positive invariant set O for the designed controller is labeled 504. The designed controller allows the disturbance to move the object state $x(t)$ more in the y-direction, but is more aggressive about rejecting disturbances in the x-direction. The result is the the minimal robust positive invariant set 504 for the designed controller guarantees that the object does not collide with the obstacle 502.

1.3 Design of Controller and Positive Invariant Set

One of the novel aspects of the present disclosure is that the controller (Eq. 6) and corresponding positive invariant set are designed using information about the object dynamics (Section 1.1) and the placement of obstacles relative to the equilibrium point. The controller and corresponding constraint-admissible robust positive invariant set can be designed by solving the optimization problem $$\exists \underset{\kappa_i, O_i}{\text{argmax}} \; \text{volume}(O_i) \tag{7}$$

$$\text{subject to } f(x, \kappa_i(x - \bar{x}_i), d) \in O_i \forall x \in O_i, \forall d \in D \tag{8}$$

$$\kappa_i(O_i - \bar{x}_i) \subseteq U, g(O_i) \subseteq Y \tag{9}$$

$$\bar{x}_i \in O_i \tag{10}$$

where $\bar{x}_i$ is the equilibrium state that the controller $\kappa_i(x - \bar{x}_i)$ stabilizes. The cost function maximizes the volume of the set $O_i$. The constraint (Eq. 8) ensures that the set $O_i$ is robust positive invariant. The constraint (Eq. 9) ensures that the set O, is constraint-admissible i.e. $\kappa_i(O_i - \bar{x}_i) \subseteq U$ and $g(O_i) \subseteq Y$. Finally constraint (Eq. 10) ensures that the set $O_i$ contains the equilibrium point $\bar{x}_i$.

The optimization problem (Section 1.3) can be computationally difficult to solve. Therefore, the present disclosure has two different embodiments for simplifying the optimization problem (Section 1.3). These embodiments assumes that the object dynamics (Section 1.1) are linear $$x(t+1)=Ax(t)+Bu(t)+d(t) \quad (11)$$

$$y(t)=Cx(t) \quad (12)$$

and the local obstacle-free region $Y_i \in Y-\bar{y}$ and input constraints U are polytypic sets $$U=\{u:H_u^j u \le K_u^j \text{ for } j=1,\ldots,m_u\} \quad (13)$$

$$Y_i=\{y:H_y^j y \le K_y^j \text{ for } j=1,\ldots,m_y\} \quad (14)$$

and the set D that bounds the disturbances d(t) is ellipsoidal $$D=\{d:d^T D d \le 1\}. \quad (15)$$

The first embodiment designs a linear controller for the object of the form $$u=F_i(x-\bar{x}_i)+\bar{u}_i \quad (16)$$

where $F_i \in R^{n_u \times n_x}$ is a constant state-feedback matrix, and $\bar{x}_i$ and $\bar{u}_i \in \text{int}(U)$ are an equilibrium (Section 1.2) state and input pair corresponding to the object position $\bar{y}_i \in \text{int}(Y)$. The present disclosure designs an ellipsoidal robust positive invariant set of the form $$O=\{x \in R^{n_x}:(x-\bar{x}_i)^T P_i(x-\bar{x}_i) \le 1\} \quad (17)$$

where $F_i \in R^{n_u \times n_x}$ is a constant matrix that defines the shape of the robust positive invariant set O, and $\bar{x}_i$ is the equilibrium (Section 1.2) state corresponding to the object position $\bar{y}_i \in \text{int}(Y)$.

For this embodiment, the present disclosure obtains the feedback gain $F_i$ and shape matrix $P_i$ by solving the optimization problem $$\text{maximize } \log \det P_i^{-1} \quad (18)$$

$$\text{subject to } \begin{bmatrix} (1-\alpha)P^{-1} & * & * \\ AP_i^{-1}+BFP_i^{-1} & P_i^{-1} & * \\ 0 & D^{-1}B^T & \alpha D^{-1} \end{bmatrix} > 0 \quad (19)$$

$$\begin{bmatrix} P_i^{-1} & * \\ H_U^j FP_i^{-1} & (K_u^j - H_u^j \bar{u})^2 \end{bmatrix} \pm 0 \text{ for } j=1,\ldots,m_u \quad (20)$$

$$\begin{bmatrix} P_i^{-1} & * \\ H_y^j CP_i^{-1} & (K_y^j - H_y^j \bar{u})^2 \end{bmatrix} \pm 0 \text{ for } j=1,\ldots,m_y. \quad (21)$$

Since the volume of the ellipsoidal set (Eq. 17) is proportional to $\det P_i^{-1}$, the cost function (Eq. 18) maximizes its volume. The constraint (Eq. 19) ensures that the ellipsoidal set $O_i$ in (Eq. 17) is robust positive invariant for all disturbances $d(t) \in D$ in the ellipsoidal disturbance set (Eq. 15). Finally the constraints (Eq. 20) and (Eq. 21) ensure that the set $O_i$ in (Eq. 17) is constraint-admissible i.e. $F_i(x-\bar{x}_i)+\bar{u}_i \in U$ for all $x \in O_i$ and $CO_i \subseteq Y_i \subseteq Y-\bar{y}_i$.

The optimization problem (Section 1.3) is a semi-define program in the decision variables $x=P_i^{-1}$ and $Y_i=F_i P_i^{-1}$.

Thus, it can be efficiently solved using standard techniques and software packages. Therefore, this design procedure is computationally tractable.

Although the optimization problem (Section 1.3) is computationally tractable, it can still Be computationally expensive to solve this problem many times for many different sample positions $\bar{y}_i \in Y$. This is especially a problem if the controllers and corresponding positive are constructed online in real-time. Therefore, another embodiment of the present disclosure simplifies the optimization problem (Section 1.3) by moving some of the computation offline and solving a simpler optimization problem online.

This embodiment of the present disclosure uses a parametric controller of the form $$u=F(\xi_i)(x-\bar{x}_i)+\bar{u}_i \quad (22)$$

and parametric positive invariant set of the form $$O(\xi_i)=\{x \in R^{n_x}:(x-\bar{x}_i)^T P(\xi_i)(x-\bar{x}_i) \le 1\} \quad (23)$$

where the feedback gain $F(\xi_i)$ and shape matrix $P(\xi_i)$ are convex combinations of l extreme feedback gains $F^j$ and shape matrices $P^j$ $$F_i=F(\xi_i)=\Sigma_{j=1}^l [\xi_i]_j F^j \quad (24)$$

$$P_i=P(\xi_i)=\Sigma_{j=1}^l [\xi_i]_j P^j \quad (25)$$

where $[\xi_i]_j$ is the j-th component of the convex-combination vector $\xi_j \in R^l$ which is contained in the set $$\Xi=\{\xi:[\xi]_j \ge 0, \Sigma_{j=1}^l [\xi]_j \le 1\}.$$

Offline, this embodiment of the present disclosure designs the extreme $F^j$ and shape matrices $P^j$ such that the parametric ellipsoidal set (Eq. 23) is positive invariant for the parametric controller (Eq. 22) for any parameter $\xi \in \Xi$. This is accomplished by solving the following feasibility problem $$\text{maximize } O \quad (26)$$

$$\text{subject to } \begin{bmatrix} Z^j + Z^{jT} - X^j & * \\ AZ^j + BY^j & X^k \end{bmatrix} > 0 \quad (27)$$

for j,k=1, . . . , l where $P^j=(X^j)^{-1} \in R^{n_x \times n_x}$ and $F^j=Y(X^j)^{-1} \in R^{n_u \times n_x}$. The variables $Z^j \in R^{n_x \times n_x}$ are used to make the constraint (Eq. 27) easier to solve. The constraint (Eq. 27) ensures that the set (Eq. 23) is positive invariant for the parametric controller (Eq. 22) for any parameter $\xi \in \Xi$.

Online this embodiment of the present disclosure selects the parameter $\xi_i \in \Xi$ that maximizes the volume of the positive invariant set (Eq. 23) while satisfying input constraints and avoiding nearby obstacles. The parameter is chosen by solving the following optimization problem $$3\xi_i = \arg\max_{\xi \in \Xi} \log \det \sum_{j=1}^l [\xi]_j P^{j-1} \quad (28)$$

$$\text{subject to } \sum_{j=1}^l [\xi]_j \begin{bmatrix} P^j & * \\ H_u^k FP & (K_u^k - H_u^k \bar{u})^2 \end{bmatrix} \pm 0 \text{ for} \quad (29)$$

$$k=1,\ldots,m_u$$

$$\sum_{j=1}^{l} [\xi]_j (H_y^k C)^T P^j H_y^k C \geq (K_y^k - H_y^k \bar{y})^2 \cdot \text{for } k = 1, \ldots, m_y \qquad (30)$$

The constraints (Eq. 29) and (Eq. 30) ensure that the parametric set $O(\xi_i)$ in (Eq. 23) is constraint-admissible i.e. $F(\xi_i)(x-\bar{x}_i)+\bar{u}_i \in U$ and $C(x-\bar{x}_i) \subseteq Y_i \subseteq Y - \bar{y}_i$ for all $x \in O(\xi_i)$. The cost function maximizes the volume of the parametric set $O(\xi_i)$ in (Eq. 23).

This embodiment of the present disclosure is less computationally expensive since it is easier to solve the optimization problem (Section 1.3) online than the optimization problem (Section 1.3). This is because the computationally expensive step of computing the extreme matrices F' and P' was moved to the offline optimization problem (Section 1.3). On the other hand, this embodiment requires more memory.

1.4 Network of Equilibrium Points

The present disclosure moves the object from an initial state $x_0$ to the final position $y_f$ by using a sequence of controllers of the form (6) that drive the object state $x(t)$ to a sequence of intermediate equilibrium states $\bar{x}_1, \ldots, \bar{x}_f$ where the final equilibrium state in the sequence $\bar{x}_f$ corresponds to the final position $\bar{y}_f$. The sequence of equilibrium points $\bar{x}_1, \ldots, \bar{x}_f$ is selected by searching a network $G=(I,E)$. The nodes of the network are triples of equilibrium points $\bar{x}_i$, and the corresponding controllers $\kappa_i$ and positive invariant sets $O_i$. The links $(i,j) \in E$ indicate when it is possible to safely move between two equilibrium points $\bar{x}_i$ and $\bar{x}_j$. Two nodes i and j are connected by a directed link $(i,j) \in E$, if the minimal robust positive invariant set $O_i^{min}$ around the equilibrium state $\bar{x}_i$ is contained $O_i^{min} \subseteq O_j$ in the robust positive invariant set $O_j$ of equilibrium point $\bar{x}_j$. Thus, by driving the object state $x(t)$ toward i-th equilibrium point $\bar{x}_i$, the i-th controller forces the state $x(t)$ into the robust positive invariant set $O_j \supseteq O_i^{min}$ of the j-th equilibrium point. Since the invariant sets are constraint-admissible, this means that it is possible to safely transition from the i-th controller to the j-th controller without violating input constraints or causing a collision with an obstacle.

Figure 6:
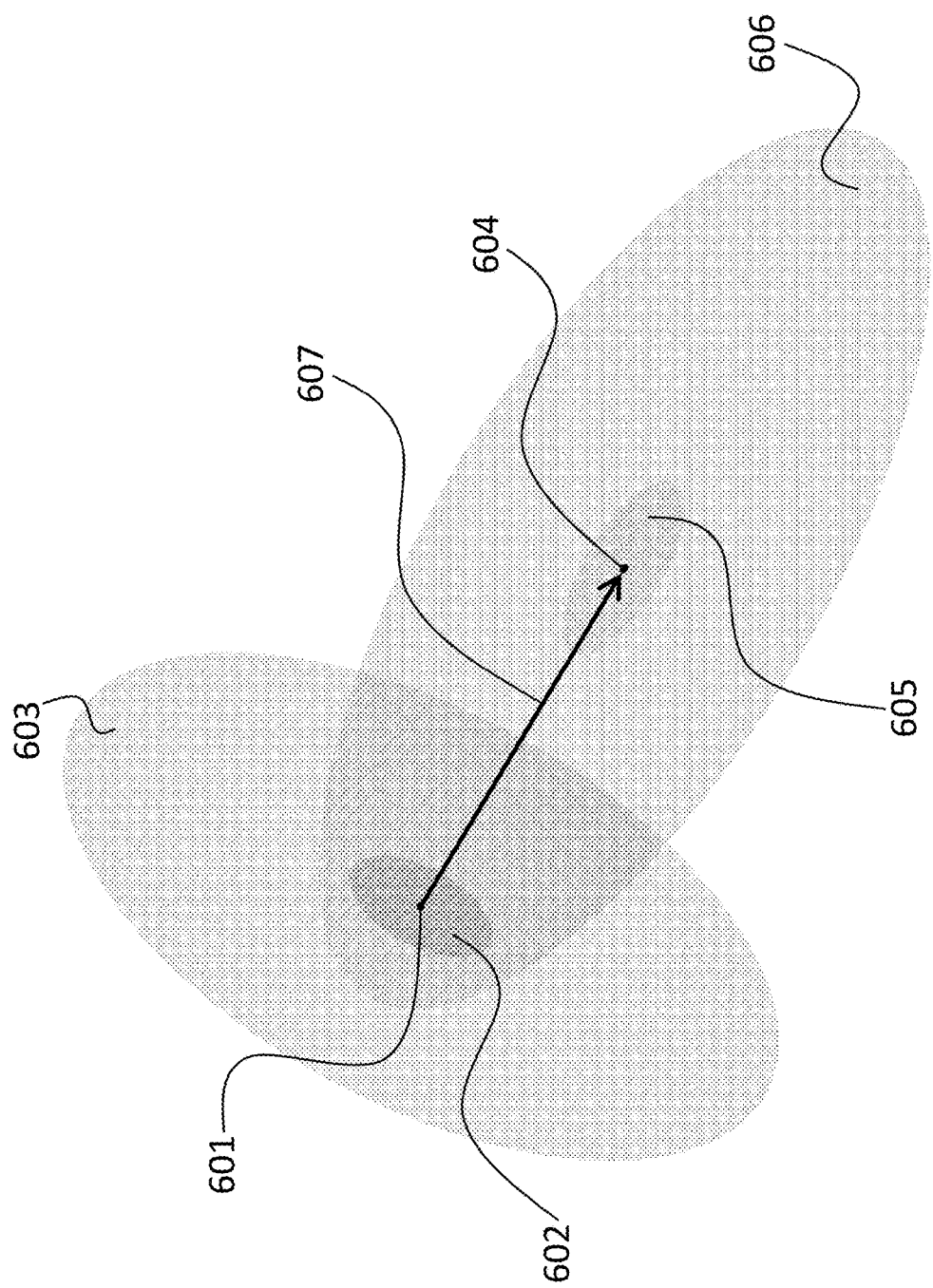
FIG. 6 is a schematic illustrating an example of a link in the network, according to embodiments of the present disclosure.
Figure 7:
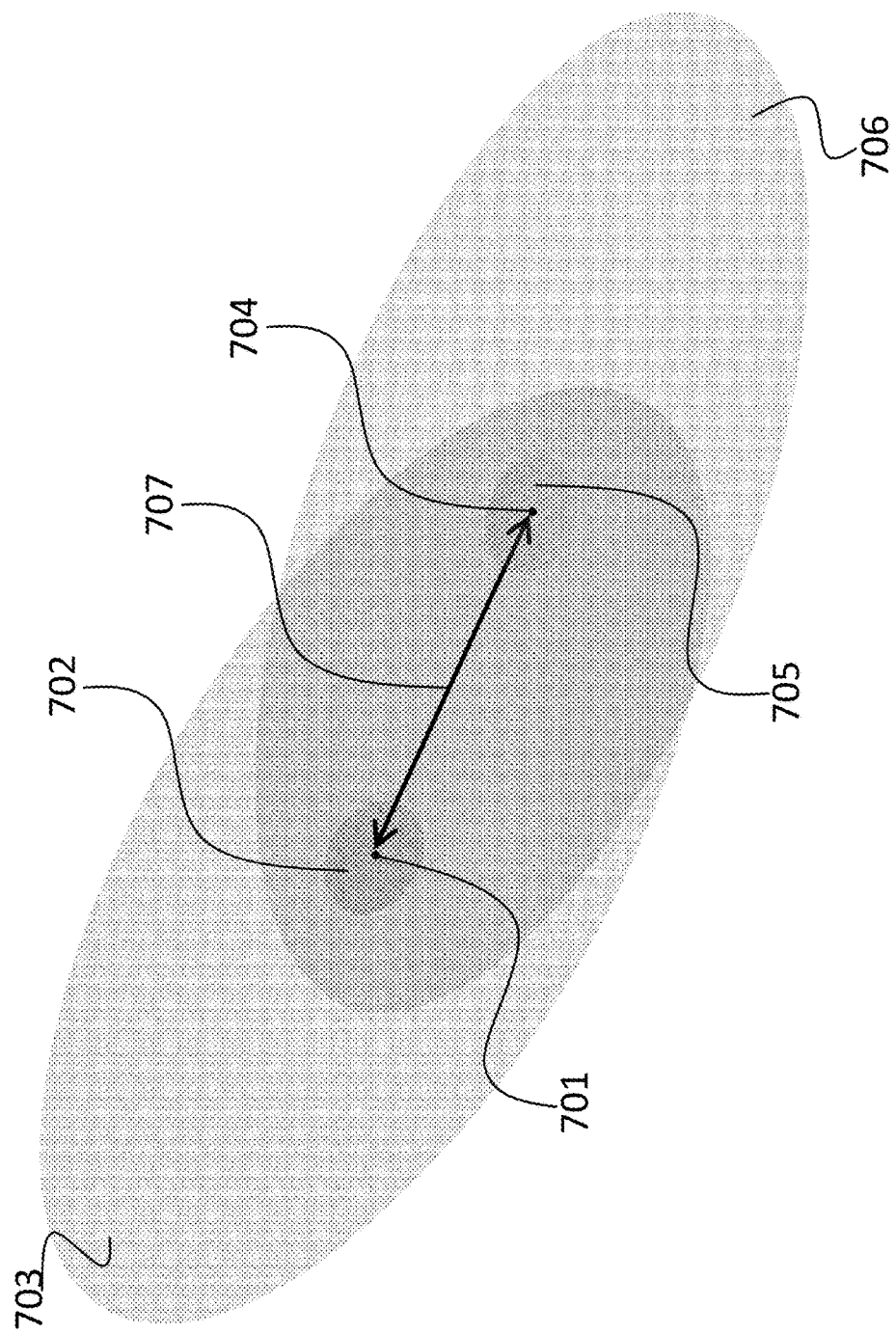
FIG. 7 is a schematic illustrating another example of a link in the network, according to embodiments of the present disclosure.

FIG. 6 and FIG. 7 show how the directed network links are defined. 6 shows two equilibrium points $\bar{x}_1$ and $\bar{x}_2$, labeled 601 and 604 respectively. Around each equilibrium point are the corresponding minimal robust positive invariant sets $O_1^{min}$ and $O_2^{min}$, labeled 602 and 605 respectively. And around the minimal robust positive invariant sets $O_1^{min}$ and $O_2^{min}$ are the robust positive invariant set $O_1$ and $O_2$, labeled 603 and 606 respectively. The nodes $I=\{1,2\}$ of the network $G=(I,E)$ in FIG. 6 are the indices 1 and 2 of the equilibrium points $\bar{x}_1$ and $\bar{x}_2$. The network $G=(I,E)$ has a directed link $(1,2) \in E$ from the first equilibrium point 601 to the second equilibrium point 604 since the minimal robust positive invariant set 602 of the first equilibrium point 601 is contained inside the robust positive invariant set 606 of the second equilibrium point 604. The link $(1,2) \in E$ is labeled 607. The link 607 indicates that it is possible to safely move from the first equilibrium 601 to the second equilibrium point 604 since the disturbed neighborhood 602 around the equilibrium point 601 is contained in the safe-set 606 of the second equilibrium point 604. The reverse link $(2,1) \notin E$ is not a link in the network since the minimal robust positive invariant set 605 of the second equilibrium point 604 is not contained inside the robust positive invariant set 603 of the first equilibrium point 601. Thus, if the object tries to move from the second equilibrium point 604 to the first equilibrium point 601, it will leave the robust positive invariant set 603 of the first equilibrium point 601 and therefore may collide with an obstacle.

FIG. 7 shows an example of a network with a bi-directional link. In FIG. 7, the equilibrium points $\bar{x}_1$ and $\bar{x}_2$ are labeled 701 and 704 respectively, the minimal robust positive invariant sets $O_1^{min}$ and $O_2^{min}$ are labeled 702 and 705 respectively, and the robust positive invariant sets $O_1$ and $O_2$ are labeled 703 and 706. The network $G=(I,E)$ in 7 has a link $(1,2) \in E$ from the first equilibrium point 701 to the second 704 and the reverse link $(2,1) \in E$ from the second equilibrium point 704 to the first 701. This is because the minimal robust positive invariant sets 702 and 705 are contained in the robust positive invariant sets 706 and 703 respectively. Thus, it is possible to safely move in either direction between the equilibrium points.

The network must contain at least one node i whose positive invariant set $O_i$ contains the initial state $x_0 \in O_i$ and at least one node j whose positive invariant set $O_j$ contains the equilibrium state $\bar{x}_j \in O_j$ corresponding to the final position $\bar{y} \in Y$. In addition, the network must contain a path from one of the nodes contain the initial state $x_0$ to one of the nodes containing the final state $\bar{x}_f$. In Section 1.5 we will describe how the present disclosure samples the obstacle-free space Y to ensure that the network satisfies these requirements.

Figure 8:
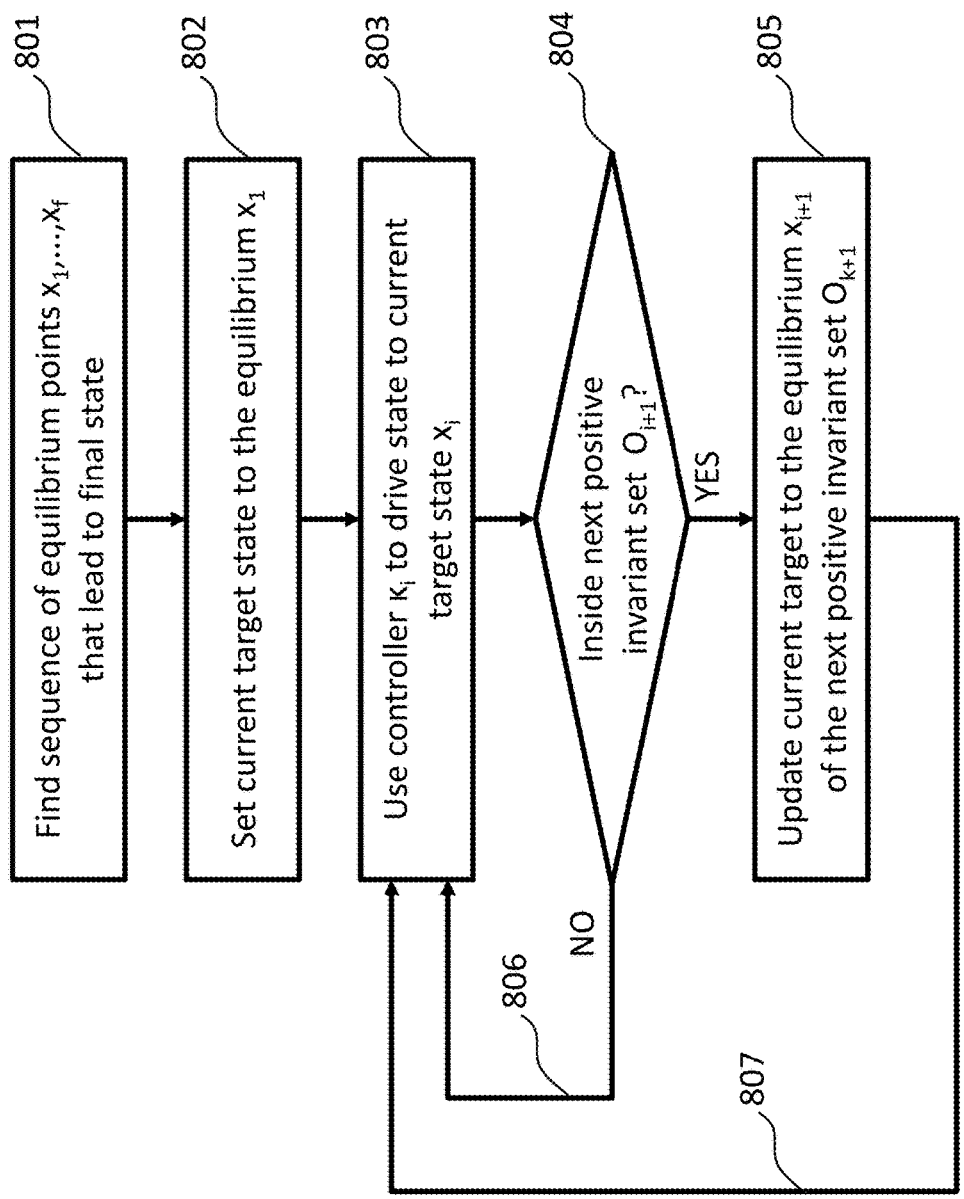
FIG. 8 is a block diagram illustrating the steps of an algorithm for using a network of equilibrium points, and the corresponding controller and invariant sets, to drive the object for the initial state to the final position, according to embodiments of the present disclosure.
Figure 9:
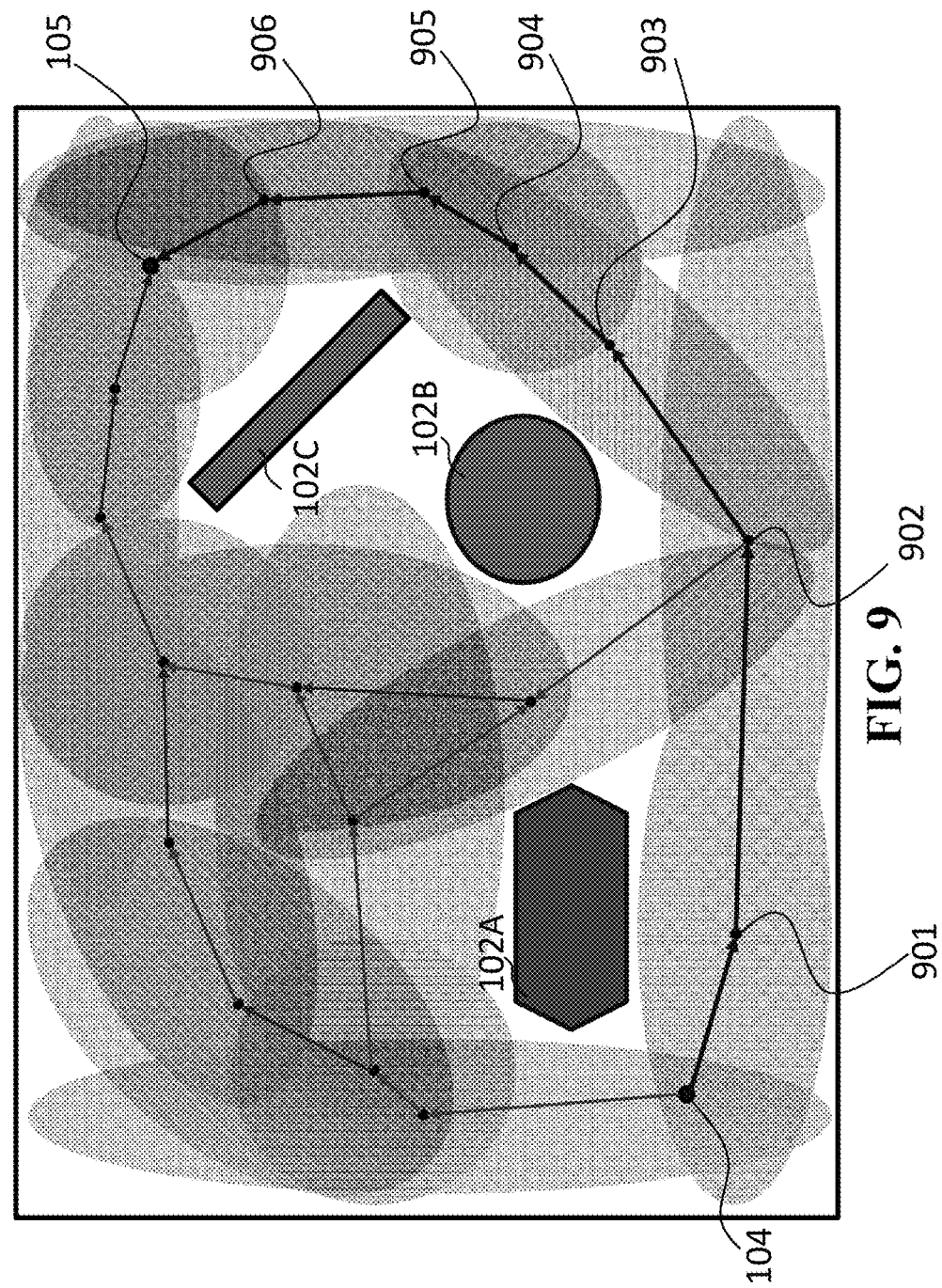
FIG. 9 is a schematic illustrating an example of a path through the network, according to an embodiment of the present disclosure.
Figure 10:
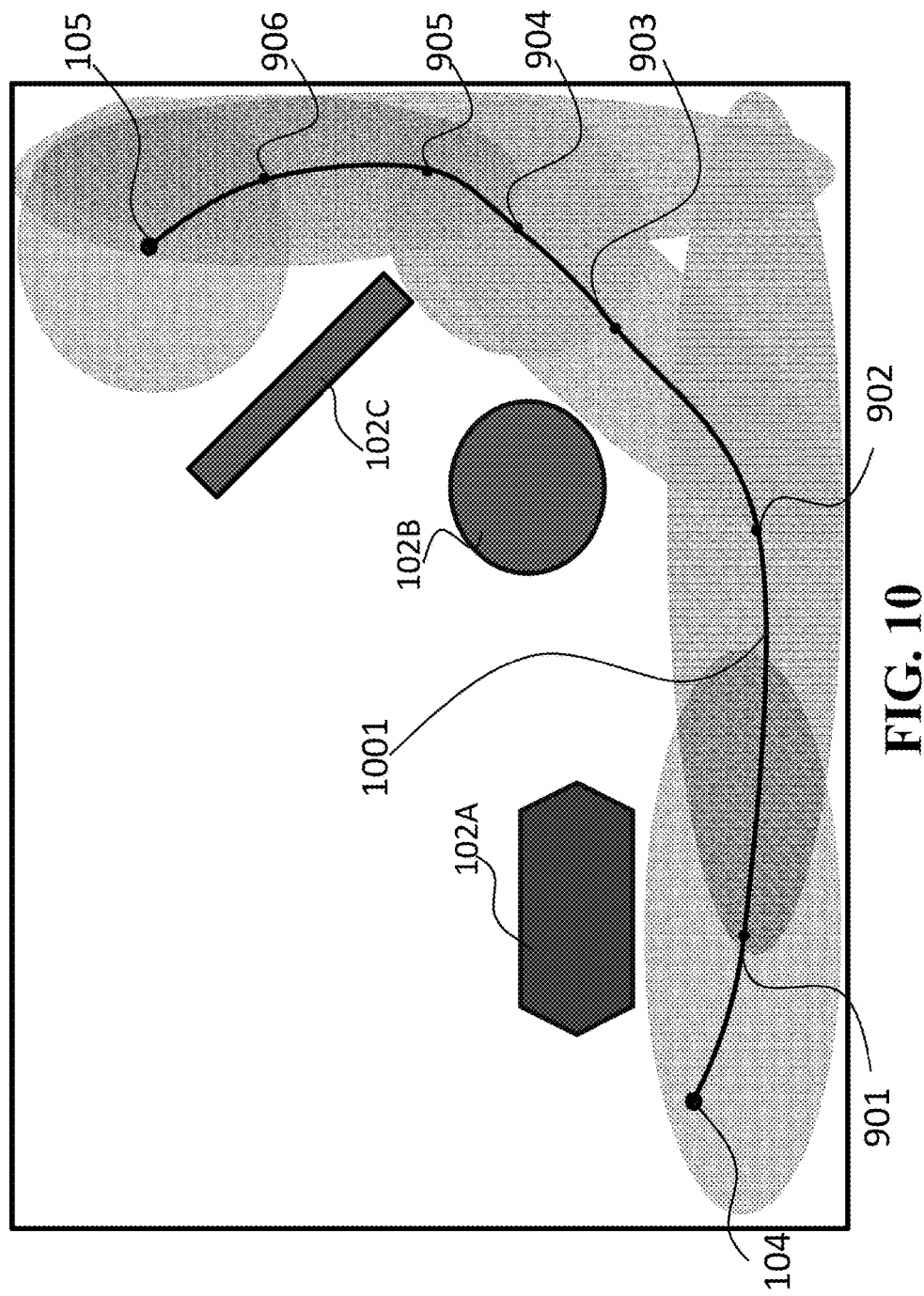
FIG. 10 is a schematic diagram illustrating an example of how the object tracks the path through the network, according to an embodiment of the present disclosure.

FIG. 8 and FIG. 9 describe how the present disclosure uses the network $G=(I,E)$ of equilibrium states, controllers, and positive invariant sets to drive the object state $x(t)$ from an initial state $x_0$ to a final state $\bar{x}_f$ while satisfying input constraints and avoiding obstacles. 8 is the algorithm used by the present disclosure to produce control inputs $u(t)$ that move the object state $x(t)$ from $x(0)=x_0$ to $x(t_f)=\bar{x}_f$. The first step of the algorithm 801 is to find a sequence of target equilibrium states where the constraint-admissible robust position invariant set $O_1$ of the first equilibrium state $\bar{x}_1$ contains the initial state $x_0$ and the final equilibrium point $\bar{x}_f$ corresponds to the final position $\bar{y}_f \in Y$. The sequence of equilibrium states $\bar{x}_1, \ldots, \bar{x}_f$ can be found using standard methods for searching for paths through networks. FIG. 9 depicts what such a path may look like.

FIG. 9 shows the obstacle-free space Y from FIG. 1B with sampled equilibrium points $\bar{x}_i$ and surrounding constraint-admissible robust positive invariant sets $O_i$. In this example, the disturbance is zero $D=\{0\}$ so that the minimal robust positive invariant sets are the equilibrium points $O_i^{min}=\{\bar{x}_1\}$. This was done to simplify the diagram. The equilibrium point in FIG. 9 are connected in a network $G=(I,E)$ according to the previously outline procedure. There are several paths through this network $G=(I,E)$ from the initial state 104 to the final equilibrium state 105. One such path is the sequence of equilibrium points 901, 902, 903, 904, 905, 906, 105 which ends at the final equilibrium state 105.

Once a sequence of target equilibrium points $\bar{x}_1, \ldots, \bar{x}_f$ has been found, the algorithm in FIG. 8 uses the corresponding controllers $\kappa_1, \ldots, \kappa_f$ to move the object state $x(t)$ between equilibrium points. The positive invariant sets $O_1, \ldots, O_f$ are used to determine when to switch controllers. Initially (802) the control input $u(t)=\kappa_1(x(t)-\bar{x}_1)$ is computed using the first controller $\kappa_1$. The controller $\kappa_i$ drives the object state $x(t)$ toward the corresponding equilibrium point $\bar{x}_i$. By the construction of the network $G=(I,E)$, as the object state $x(t)$ approaches the equilibrium point $\bar{x}_i$ it enters the robust positive invariant set $O_{i+1}$ of the next equilibrium point $\bar{x}_{i+1}$ in the sequence $\bar{x}_1, \ldots \bar{x}_f$. In each iteration, the algorithm tests (803) when the object state $x(t)$ has entered then next robust positive invariant set $O_{i+1}$. If it has (805), then the algorithm updates the target equilibrium point $\bar{x}_{i+1}$ and uses the next controller $\kappa_{i+1}$. The algorithm continues (806 and 807) to use the controller $\kappa_i$ corresponding to the currently targeted equilibrium point $\bar{x}_i$. Eventually the target equilibrium point $\bar{x}_f$ becomes the equilibrium point $\bar{x}_f$ corresponding to the final position $\bar{y}_f$ and the controller $\kappa_f$ drives the object state x(t) to that equilibrium point $\bar{x}_f$. 10 shows an example of the trajectory of the object y(t) as it move from the initial position 104 to the final position 105. Due to the dynamics (Section 1.1) of the object, it does not move in straight-lines between the equilibrium points. Nonetheless, the object does not collide with the obstacles 102A, 102B, 102C since the trajectory y(t) never leaves the constraint-admissible robust positive invariant sets.

One of the advantages of having larger positive invariant sets is that the network G=(I,E) will have more connections since it is more likely that the minimal robust positive invariant set $O_i^{min}$ for node i∈I will lie entirely inside the constraint-admissible robust control invariant set $O_j$ of node j∈I if the set $O_j$ is very large. Therefore, larger constraint-admissible robust control invariant set $O_j$ produce networks G=(I,E) with more potential paths from the initial state $x_0$ to the final position $y_f$. Having more paths to chose from leads to better performance. In addition, having larger positive invariant sets means that the present disclosure needs to sample fewer points $\bar{x}$∈Y to find a path through the obstacle-free region Y. The next section details how the present disclosure samples the obstacle-free space.

1.5 Sampling of Equilibrium Points

The present disclosure constructs the network G=(I,E) by sampling points $\bar{y}_i$∈Y form the obstacle-free space Y. We describe two embodiments of the present disclosure for sampling the obstacle-free space Y.

Figure 11:
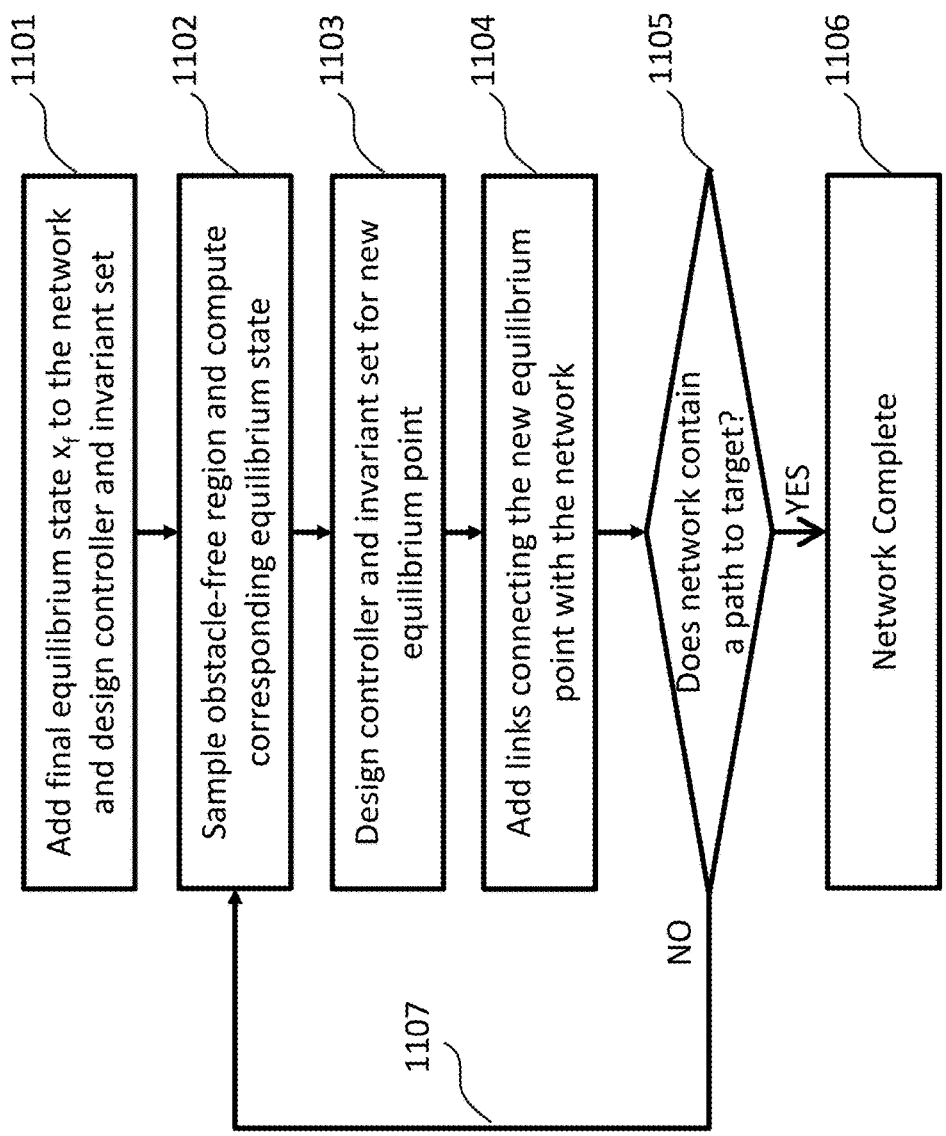
FIG. 11 is a block diagram illustrating the steps of an algorithm for sampling the obstacle-free space to construct a network of equilibrium points, according to an embodiment of the present disclosure.

Referring to FIG. 11, an embodiment of the present disclosure is described by FIG. 11. The present disclosure initializes the Network G=(I,E) by creating a node I={f} for the final position $\bar{y}_f$∈Y (1101). This node contains the equilibrium point $\bar{x}_f$ corresponding to the final position $\bar{y}_f$, a controller $\kappa_f$ that drives the state x(t) of the object to this equilibrium point $\bar{x}_f$, and a constraint-admissible positive invariant $O_f$ set around the equilibrium that indicates when it is safe to use the controller $\kappa_f$. The controller $\kappa_f$ and positive invariant set $O_f$ are designed using the methods described in Section 1.3.

During each iteration, the algorithm in FIG. 11 randomly samples a point $\bar{y}_{new}$∈Y in the obstacle-free space Y and creates a corresponding node in the network G=(I,E) (1102). The node contains an equilibrium point $\bar{x}^{new}$, controller $\kappa_{new}$, and robust positive invariant set $O_{new}$ (1103). Next, the present disclosure determines how the new node $i_{new}$ is linked to the network G=(I,E) (1104). For each existing node $i_{old}$∈I in the network G=(I,E), the present disclosure tests whether the minimal robust positive invariant set $O_{new}^{min}$ of the new node $i_{new}$∈I is contain inside the robust positive invariant set $O_{old}$. If so, then a link $(i_{new},i_{old})$∈E is added to the network indicating that it is possible to safely transition from controller $\kappa_{new}$ to $\kappa_{old}$. Likewise the algorithm tests whether the minimal robust positive invariant set $O_{old}^{min}$ is contain inside the robust positive invariant set $O_{new}$ of the new node $i_{new}$∈I. If so, then a link $(i_{old},i_{new})$∈E is added to the network indicating that it is possible to safely transition from controller $\kappa_{old}$ to $\kappa_{new}$.

Still referring to FIG. 11, the present disclosure continues (1107) adding random nodes to the network G=(I,E) until (1106) the network contains a path from a node containing the initial state $x_0$ to the node f∈I corresponding to the final equilibrium state (1105).

Figure 12:
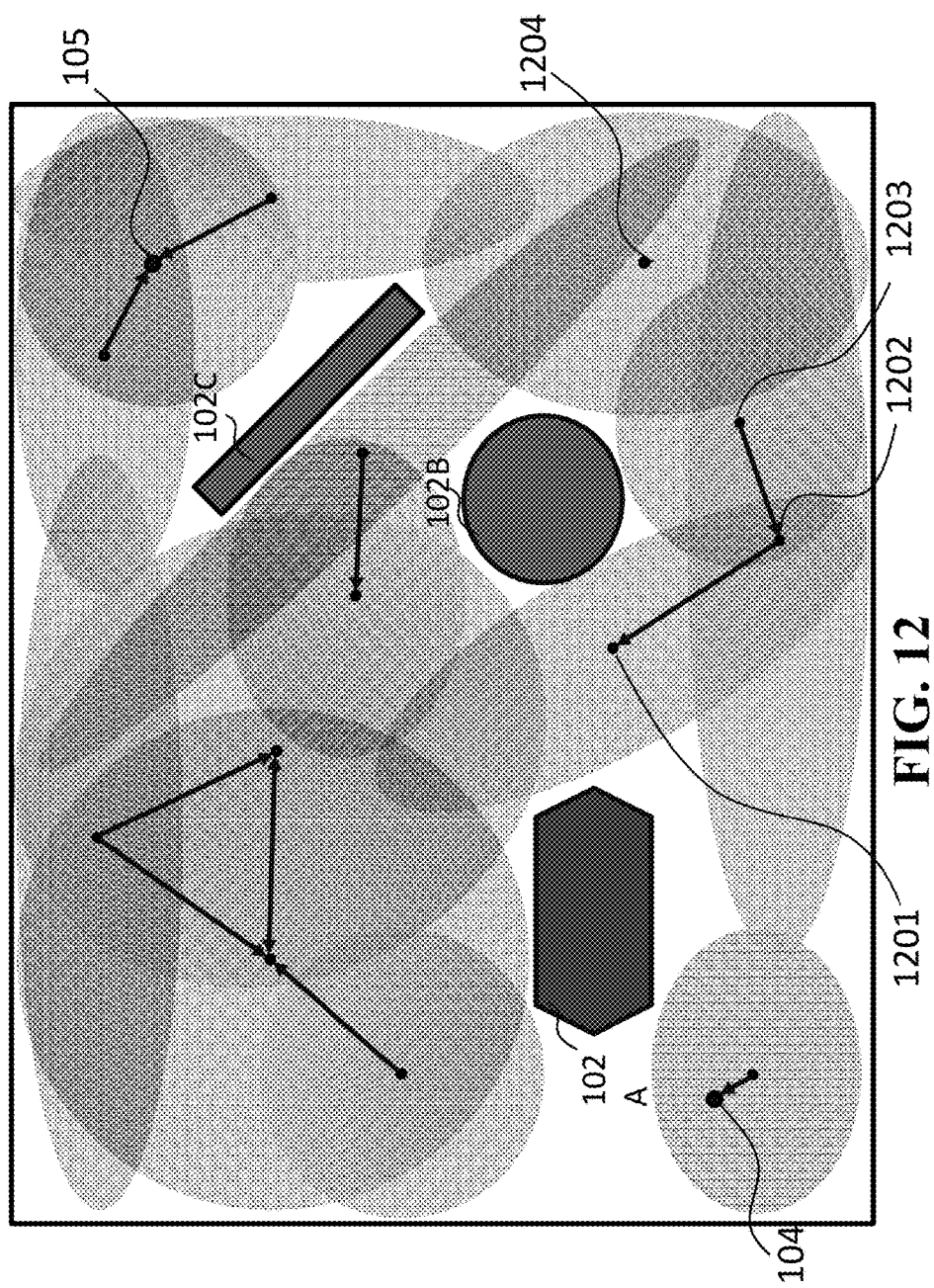
FIG. 12 is a schematic diagram illustrating an example of a disconnected network produced by the algorithm of FIG. 11, according to an embodiment of the present disclosure.

Referring to FIG. 12, the previous embodiment of FIG. 11 can create many nodes that are neither connected to the initial state $x_0$ nor the final equilibrium state $\bar{x}_f$ as shown in FIG. 12. The network shown in FIG. 12 contains main disconnected subnetworks. For instance the three nodes 1201, 1202, 1203 are connected to each other but not any of the other nodes. And the node 1204 forms a singleton subnetwork not connected to any other nodes. Creating nodes or clusters of nodes that are not connected to the rest of the network is a waste of computational effort. Therefore, another embodiment of the present disclosure modifies the previous embodiment to ensure all nodes added to the network are connected with a previously added node.

Figure 13:
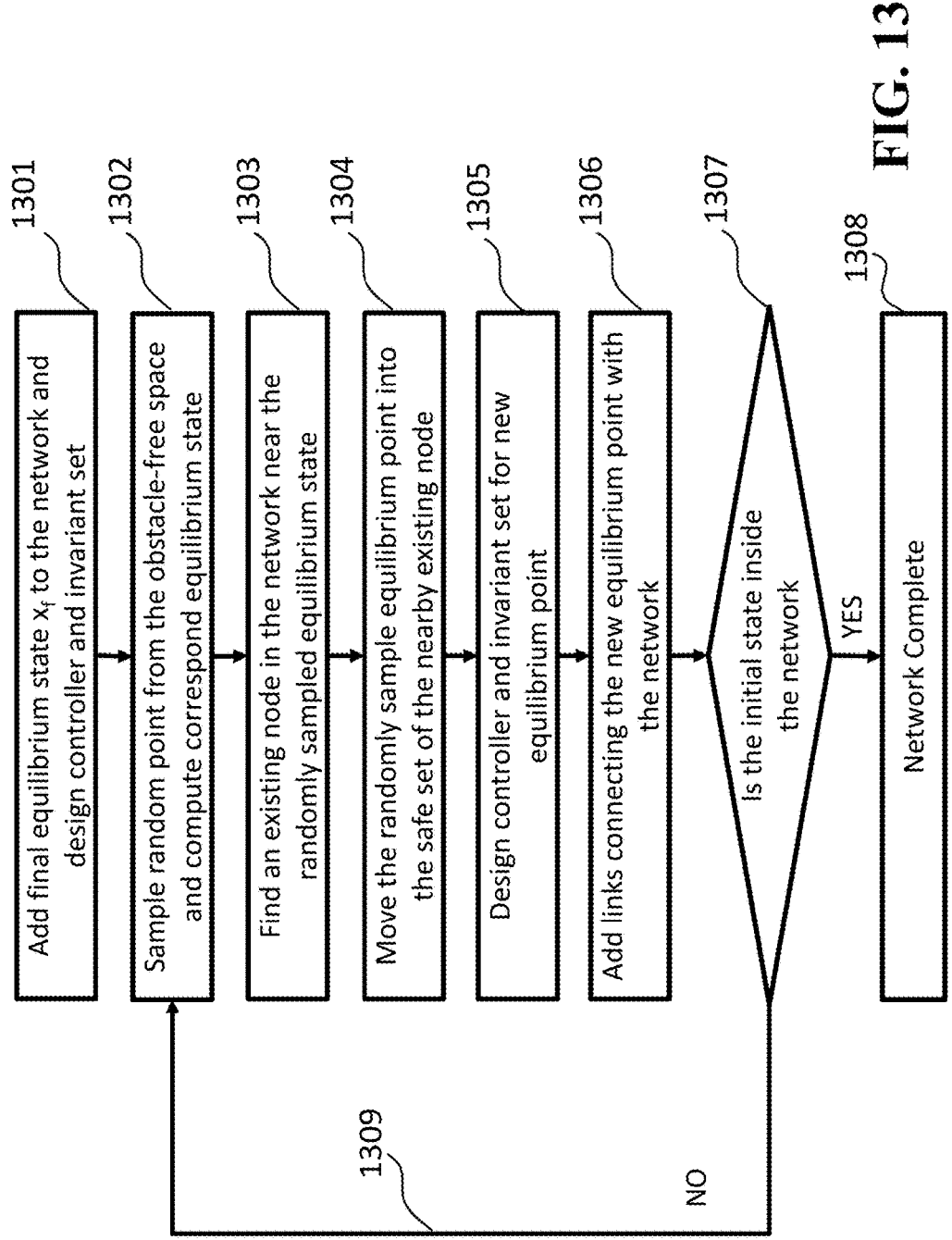
FIG. 13 is a block diagram illustrating the steps of another algorithm for sampling the obstacle-free space to construct a network of equilibrium points, according to an embodiment of the present disclosure.

FIG. 13 shows another embodiment of the present disclosure. The present disclosure initializes (1301) the network G=(I,E) by creating a node l={f} for the final position. This node contains the equilibrium point $\bar{x}_f$ corresponding to the final position $\bar{y}_f$, a controller $\kappa_f$ that drives the state x(t) of the object to this equilibrium point $\bar{x}_f$, and a constraint-admissible positive invariant $O_f$ set around the equilibrium that indicates when it is safe to use the controller $\kappa_f$. The controller $\kappa_f$ and positive invariant set $O_f$ are designed using the methods described in Section 1.3.

Still referring to FIG. 13, during each iteration, the present disclosure samples a point grand $\bar{y}_{tand}$∈Y in the obstacle-free space Y and computes the corresponding equilibrium state $\bar{x}_{tand}$ and input $\bar{u}_{tand}$ (1302). In this embodiment, the random equilibrium state $\bar{x}_{tand}$ is moved to a nearby equilibrium state $\bar{x}_{near}$ in the network G. The nearest neighbor is defined in terms of the constraint-admissible positive invariant sets $O_i$ of the nodes i∈l, using the Minkowski function $$3\Phi_{O_i-\bar{x}_i}(x) = \text{minimize}_{\lambda \geq 0} \lambda, \qquad (31)$$

$$\text{subject to } x \in \lambda(O_i - \bar{x}_i). \qquad (32)$$

The Minkowski function (Section 1.5) measures the distance between the random equilibrium state $\bar{x}_{tand}$ and the equilibrium point $\bar{x}_i$ for vertex i∈l, by determining how much we need to scale the safe-set $O_i$ in order to contain the random point $\bar{x}_{tand}$∈λ($O_i-\bar{x}_i$). If the Minkowski function is less than one, i.e., $\Phi_{O_i}(\bar{x}_{tand}) \leq 1$, then the random point $\bar{x}_{tand}$ is inside the safe-set $O_i$.

Figure 14:
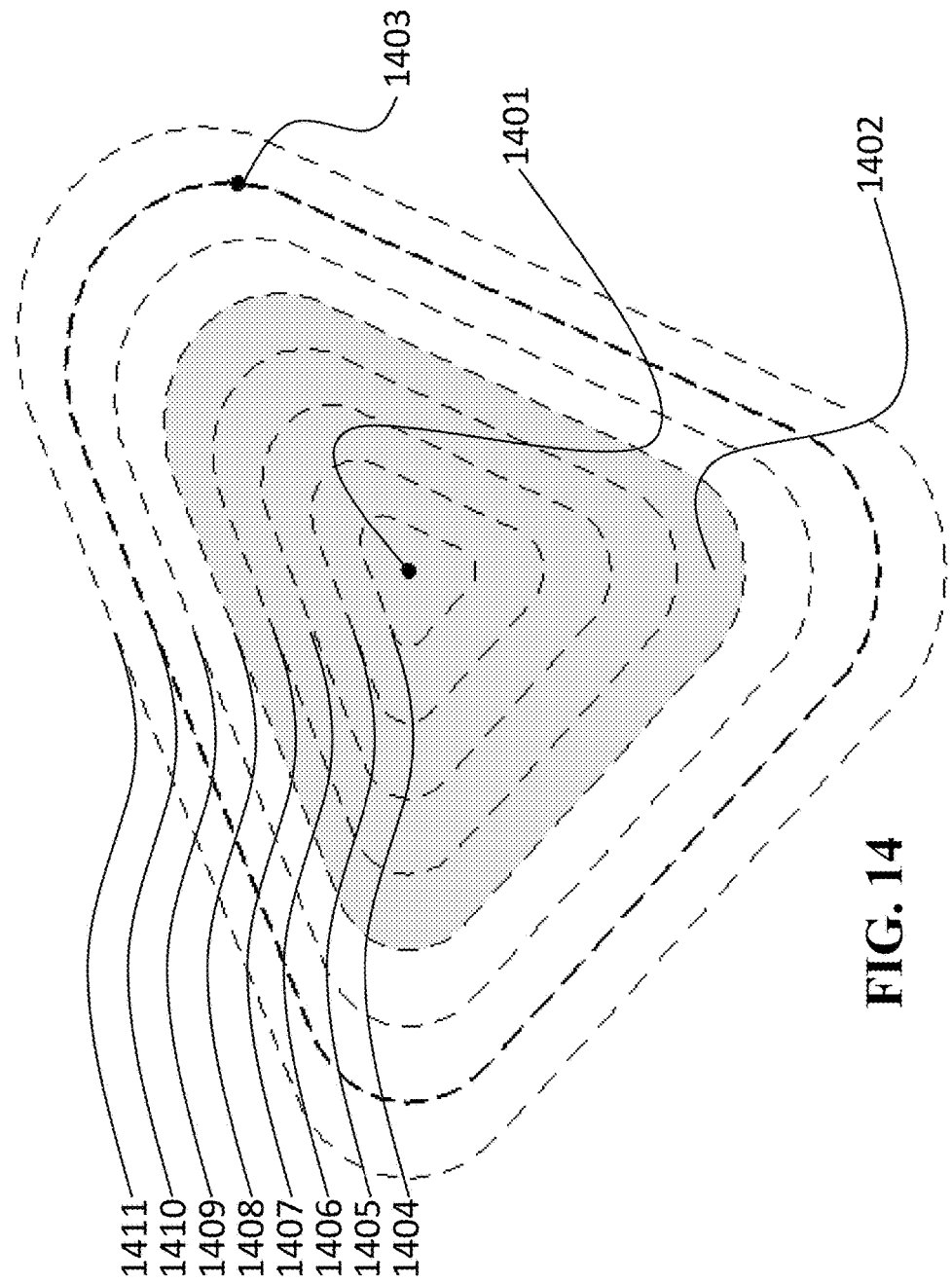
FIG. 14 is a block diagram illustrating how the Minkowski function uses a set to measure distance, according to an embodiment of the present disclosure.

FIG. 14 shows how the Minkowski function measures distance. FIG. 14 shows an equilibrium point $\bar{x}$ labeled 1401 and the surrounding positive invariant set O, shown in gray and labeled 1402. The dashed lines, labeled 1404 through 1411, are at a constant distance from the equilibrium point 1401 in terms of the Minkowski function (Section 1.5) using the positive invariant set 1402. The dashed-lines 1404-1411 are at distances 0.2, 0.4, 0.6, 0.8, 1.0, 1.2, 1.4 and 1.6 respectively. The point labeled 1403 is at a distance of 1.4 since the positive invariant set 1402 needs to be scaled-up 140% to contain the point 1402.

Referring to FIG. 13 and FIG. 14, in this embodiment, the nearest neighbor $i_{near}$∈l is then chosen as the node I in the network G=(I,E) closest to $\bar{x}_{tand}$ (1303) in terms of the Minkowski function (Section 1.5), $$i_{near} = \underset{i \in l}{\arg\min} \Phi_{O_i-\bar{x}_i}(\bar{x}_{rand}). \qquad (33)$$

This nearest neighbor rule (Eq. 33) tends to choose the nodes i∈l with the largest safe-sets $O_i$, since these sets are more likely to need less scaling $\lambda(O_i-\bar{x}_i)$ to contain the random state $\bar{x}_{tand}$. Thus, the output sample points $y_i$∈Y are far apart which reduces the amount of sampling needed to find a path through the obstacle-free space Y.

In other embodiments of the present disclosure, the "nearest neighbor" can be selected using different heuristics. For instance, the nearest neighbor $i_{near}$ can be selected as the existing equilibrium point $\bar{x}_{near}$ with the lowest cost $$i_{near} = \underset{i \in I}{\arg\min} V(\bar{x}_i, \bar{x}_{rand}). \quad (34)$$

where $V(\bar{x}_{tand}, \bar{x}_i)$ is some heuristic cost function used to reduce fuel consumption, reduce travel-time, or produce smoother paths.

Still referring to FIG. 13 and FIG. 14, next, the present disclosure selects a new equilibrium point $\bar{x}_{new}$ by moving the random equilibrium point $\bar{x}_{tand}$ closer to the nearest point $\bar{x}_{near}$ using the rule (1304)

$$\bar{x}_{new} = \bar{x}_{near} + \frac{\alpha}{\lambda}(\bar{x}_{rand} - \bar{x}_{near}) \quad (35)$$

where $\Delta = \Phi_{O_{near} - \bar{x}_{near}}(\bar{x}_{tand})$ is the Minkowski function (Section 1.5), $\alpha \in (0,1)$ is the step-size chosen to ensure that the minimal robust positive invariant set $O_{new}^{min}$ is contained in the set $O_{near}$, and $O_{near}$ is the safe-set associated with vertex $i_{near} \in I$, generated during previous iterations of the algorithm. By the properties of the Minkowski function (Section 1.5), the new equilibrium point $\bar{x}_{new} \in O_{near}$, selected by (Eq. 35), will be inside the safe-set $O_{near}$ associated with the equilibrium point $\bar{x}_{near}$. Hence, it is possible to safely move from the new equilibrium point $\bar{x}_{new}$ to the existing equilibrium point $\bar{x}_{near}$ using the local controller $\kappa_{near}$ without collision. Since the network is initialized with the equilibrium point $\bar{x}_f$ corresponding to the target output $y_f$, it follows that there exists a path in the network G from the new equilibrium point $\bar{x}_{new}$ to the final equilibrium state $\bar{x}_f$.

Still referring to FIG. 13 and FIG. 14, next, the present disclosure computes a controller $\kappa_{new}$ that drives the state $x(t)$ of the object to this equilibrium point $\bar{x}_{new}$, and a constraint-admissible robust positive invariant $O_{new}$ set around the equilibrium that indicates when it is safe to use the controller $\kappa_{new}$ (1305). The triple of the equilibrium point $\bar{x}_{new}$, the controller $\kappa_{new}$, and the set $O_{new}$ are added as a node $I \leftarrow I \cup \{i_{new}\}$ in the network G=(I,E). a link between nodes $i_{new}$ and $i_{near}$ to added the link list E of the network G=(I,E) (1306). The algorithm terminates (1308) when the invariant set $O_{new}$ of the newly added node $i_{new} \in I$ contains the initial state $x_0 \in O_{new}$ (1307). By the construction, this guarantees that there is a path in the network G from the initial state $x_0$ to the final equilibrium state $\bar{x}_f$.

Figure 15:
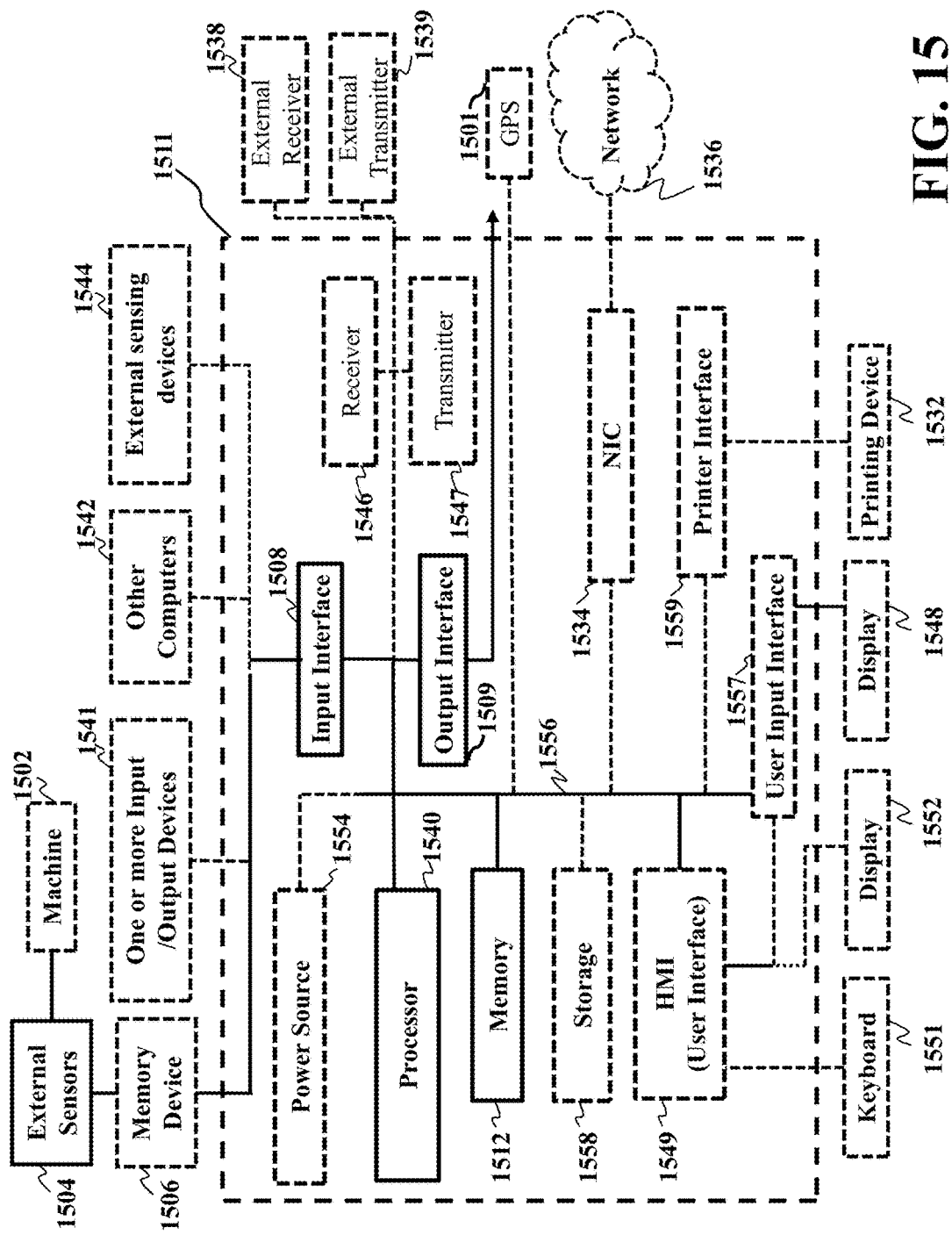
FIG. 15 is a block diagram of illustrating the method of FIG. 1A, that can be implemented using an alternate computer or processor, according to embodiments of the present disclosure.

FIG. 15 is a block diagram of illustrating the method of FIG. 1A, that can be implemented using an alternate computer or processor, according to embodiments of the present disclosure. The computer 1511 includes a processor 1540, computer readable memory 1512, storage 1558 and user interface 1549 with display 1552 and keyboard 1551, which are connected through bus 1556. For example, the user interface 1564 in communication with the processor 1540 and the computer readable memory 1512, acquires and stores the set of training data examples in the computer readable memory 1512 upon receiving an input from a surface, keyboard surface 1564, of the user interface 1564 by a user.

The computer 1511 can include a power source 1554, depending upon the application the power source 1554 may be optionally located outside of the computer 1511. Linked through bus 1556 can be a user input interface 1557 adapted to connect to a display device 1548, wherein the display device 1548 can include a computer monitor, camera, television, projector, or mobile device, among others. A printer interface 1559 can also be connected through bus 1556 and adapted to connect to a printing device 1532, wherein the printing device 1532 can include a liquid inkjet printer, solid ink printer, large-scale commercial printer, thermal printer, UV printer, or dye-sublimation printer, among others. A network interface controller (NIC) 1534 is adapted to connect through the bus 1556 to a network 1536, wherein time series data or other data, among other things, can be rendered on a third party display device, third party imaging device, and/or third party printing device outside of the computer 1511.

Still referring to FIG. 15, the time series data or other data, among other things, can be transmitted over a communication channel of the network 1536, and/or stored within the storage system 1558 for storage and/or further processing. Further, the time series data or other data may be received wirelessly or hard wired from a receiver 1546 (or external receiver 1538) or transmitted via a transmitter 1547 (or external transmitter 1539) wirelessly or hard wired, the receiver 1546 and transmitter 1547 are both connected through the bus 1556. The computer 1511 may be connected via an input interface 1508 to external sensing devices 1544 and external input/output devices 1541. For example, the external sensing devices 1544 may include sensors gathering data before-during-after of the collected time-series data of the machine. For instance, environmental conditions approximate the machine or not approximate the machine, i.e. temperature at or near machine, temperature in building of location of machine, temperature of outdoors exterior to the building of the machine, video of machine itself, video of areas approximate machine, video of areas not approximate the machine, other data related to aspects of the machine. The computer 1511 may be connected to other external computers 1542. An output interface 1509 may be used to output the processed data from the processor 1540. It is noted that a user interface 1549 in communication with the processor 1540 and the non-transitory computer readable storage medium 1512, acquires and stores the region data in the non-transitory computer readable storage medium 1512 upon receiving an input from a surface 1552 of the user interface 1549 by a user.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A method for controlling a motion of an object from an initial location to a final location within a region while avoiding a set of obstacles located in the region, wherein a processor is in communication with a memory, and the memory includes stored region data, the stored region data includes obstacles located in the region, an obstacle-free region of the region, equilibrium points within the obstacle-free region of the region and the initial location and the final location within the region, the method comprising:
    selecting, by a processor, the equilibrium points within the obstacle-free region of the region from the memory, wherein each equilibrium point includes a corresponding controller that drives the object to the equilibrium point, such that each controller includes a corresponding state partition;
    designing the controller and the corresponding state partition, based on the obstacle-free region around the equilibrium point, to produce a collection of controllers and corresponding equilibrium points and corresponding state partitions, that connect the initial location with the final location, such that at least one state partition includes the initial location and at least one state partition includes the final location,
    wherein each state partition is a sub-region of the region that is obstacle free within the region, and if the object is in the corresponding state partition of the controller, then the controller directs all the trajectories of the object to remain within the corresponding state partition and to move to the equilibrium point of the corresponding controller; and
    determining actuator commands at time T using a controller corresponding to a state partition that includes the location of the object at time T, such that the resulting sequence over a period of time of actuator commands, moves the object from the initial location to the final location over the period of time, wherein the determined actuator commands move the object to prevent the object from colliding with the set of obstacles located in the region and assists in management of guiding the object.

2. The method of claim 1, further comprising:
    forming a network of state partitions, wherein a first state partition is linked to a second state partition in the network, when the equilibrium point of the first partition is within the second state partition; and
    searching the network of linked state partitions to select the sequence of overlapping state partitions.

3. The method of claim 2, wherein the network includes nodes, such that each node of the network includes three controllers, three corresponding equilibrium points, and three corresponding state partitions.

4. The method of claim 1, wherein the designing the controller and the corresponding state partition includes:
    determining the controller that increases a volume of the corresponding state partition surrounding the equilibrium point relative to a predesigned controller.

5. The method of claim 4, wherein the determining of the controller includes:
    formulating an optimization problem that maximizes the volume of the corresponding state partition; and
    solving the optimization problem to jointly produce the controller and the corresponding state partition.

6. The method of claim 4, wherein determining the controller further comprising:
    formulating a feasibility problem that identifies extreme feedback gains and shape matrices, such that convex combinations of feedback gains stabilizes an equilibrium point and convex combinations of shape matrices forms a positive invariant set;
    formulating an optimization problem for identifying the convex combination of feedback gains and shape matrices that produces the positive invariant set that is constraint-admissible and has a maximum volume; and
    solving the optimization problem to jointly produce the controller and the state partition.

7. The method of claim 1, further comprising:
    sampling randomly the collection of equilibrium points in the obstacle-free region of the region;
    determining jointly a pair of corresponding controllers and corresponding state partitions for each equilibrium point to form collections of controllers and state partitions;
    adding a triple of moved equilibrium points and the corresponding controllers and state partitions to a network of state partitions; and
    linking the corresponding state partition to the closest state partition.

8. The method of claim 1, further comprising:
    determining iteratively the collections of controllers and state partitions, wherein an iteration includes:
    sampling an equilibrium point in the obstacle-free region of the region;
    moving the sampled equilibrium point within the closest state partition determined during a previous iteration;
    determining the corresponding controller and the state partition for the moved equilibrium point;
    adding a triple of moved equilibrium point and the corresponding controller and the state partition to a network of state partitions; and
    linking the corresponding state partition to the closest state partition.

9. A non-transitory computer readable storage medium embodied thereon a program executable by a computer for performing a method, the method for controlling a motion of an object from an initial location to a final location within a region, while avoiding a set of obstacles located in the region, such that the non-transitory computer readable storage medium includes stored region data, the stored region data includes obstacles located in the region, an obstacle-free region of the region, equilibrium points within the obstacle-free region of the region and an initial location and the final location within the region, the method comprising:

selecting, by the processor, equilibrium points within the obstacle-free region of the region, wherein each equilibrium point includes a corresponding controller that drives the object to the equilibrium point, such that each controller includes a corresponding state partition and an actuator;

designing, by the processor, the controller and the corresponding state partition, based on the obstacle-free region around the equilibrium point, to produce a collection of controllers and corresponding equilibrium points and corresponding state partitions, connecting the initial location with the final location, such that at least one state partition includes the initial location and at least one state partition includes the final location, wherein each state partition is a sub-region of the region that is obstacle free within the region, and if the object is in the corresponding state partition of the controller, then the controller directs all the trajectories of the object to remain within the corresponding state partition and to move to the equilibrium point of the corresponding controller; and determining, by the processor, actuator commands at time T using a controller corresponding to a state partition that includes the location of the object at time T, such that the resulting sequence over a period of time of actuator commands, moves the object from the initial location to the final location over the period of time, wherein the method assists in management of guiding the object.

10. The method of claim 9, further comprising:
forming a network of state partitions, wherein a first state partition is linked to a second state partition in the network, when the equilibrium point of the first partition is within the second state partition; and
searching the network of linked state partitions to select the sequence of overlapping state partitions.

11. The method of claim 10, wherein the network includes nodes, such that each node of the network includes three controllers, three corresponding equilibrium points, and three corresponding state partitions.

12. The method of claim 9, wherein the designing the controller and the corresponding state partition includes:
determining the controller that increases the volume of the corresponding state partition surrounding the equilibrium point relative to a predesigned controller.

13. The method of claim 12, wherein the determining of the controller includes:
formulating an optimization problem that maximizes a volume of the corresponding state partition; and
solving the optimization problem to jointly produce the controller and the corresponding state partition.

14. The method of claim 9, wherein a user interface in communication with the processor and the non-transitory computer readable storage medium, acquires and stores the region data in the non-transitory computer readable storage medium upon receiving an input from a surface of the user interface by a user.

15. A system for controlling a motion of an object from an initial location to a final location within a region, while avoiding a set of obstacles located in the region, the system comprising:
at least one actuator is in communication with a controller;
a computer readable memory to store and provide region data, the stored region data includes obstacles located in the region, an obstacle-free region of the region, equilibrium points within the obstacle-free region of the region and an initial location and the final location within the region;
a processor in communication with the computer readable memory, is configured to:
select equilibrium points within an obstacle-free region of a region, wherein each equilibrium point includes a corresponding controller that drives the object to the equilibrium point, such that each controller includes a corresponding state partition;
design the controller and the corresponding state partition, based on the obstacle-free region around the equilibrium point, to produce a collection of controllers, corresponding equilibrium points and corresponding state partitions, connecting the initial location with the final location, such that at least one state partition includes the initial location and at least one state partition includes the final location,
wherein each state partition is a sub-region of the region that is obstacle free within the region, and if the object is in the corresponding state partition of the controller, then the controller directs all the trajectories of the object to remain within the corresponding state partition and to move to the equilibrium point of the corresponding controller; and
determine actuator commands at time T using a controller corresponding to a state partition that includes the location of the object at time T, such that the resulting sequence over a period of time of actuator commands, moves the object from the initial location to the final location over the period of time, and displaying the movement of the object via the determined actuator commands on a user interface.

16. The system of claim 15, further comprising:
form a network of state partitions, wherein a first state partition is linked to a second state partition in the network, when the equilibrium point of the first partition is within the second state partition; and
search the network of linked state partitions to select the sequence of overlapping state partitions.

17. The system of claim 16, wherein the network includes nodes, such that each node of the network includes three controllers, three corresponding equilibrium points, and three corresponding state partitions.

18. The system of claim 15, wherein the designing the controller and the corresponding state partition includes:
determine the controller that increases the volume of the corresponding state partition surrounding the equilibrium point relative to a predesigned controller.

19. The system of claim 15, further comprising:
sample randomly the collection of equilibrium points in the obstacle-free region of the region;
determine jointly a pair of corresponding controllers and corresponding state partitions for each equilibrium point to form collections of controllers and state partitions;
add a triple of moved equilibrium points and the corresponding controllers and state partitions to a network of state partitions; and
link the corresponding state partition to the closest state partition.

20. The system of claim 15, further comprising:
determine iteratively the collections of controllers and state partitions, wherein an iteration includes:

sample an equilibrium point in the obstacle-free region of the region;

move the sampled equilibrium point within the closest state partition determined during a previous iteration;

determine the corresponding controller and the state partition for the moved equilibrium point;

add a triple of moved equilibrium point and the corresponding controller and the state partition to a network of state partitions; and link the corresponding state partition to the closest state partition.

* * * * *